United States Patent [19]

Blevins et al.

[11] Patent Number: 5,045,571
[45] Date of Patent: Sep. 3, 1991

[54] SILICONE POLYETHER COPOLYMERS AND POLYURETHANE FOAMS PREPARED THEREFROM

[75] Inventors: Charles H. Blevins, Beacon; George H. Greene, Croton-On-Hudson; Paul L. Matlock, Ossining; Gerald J. Murphy, Wappingers Falls, all of N.Y.

[73] Assignee: Union Carbide Chemicals and Plastics Technology Corporation, Danbury, Conn.

[21] Appl. No.: 540,173

[22] Filed: Jun. 19, 1990

Related U.S. Application Data

[62] Division of Ser. No. 268,187, Nov. 7, 1988, Pat. No. 4,962,218.

[51] Int. Cl.$^5$ .............................................. C08G 18/14
[52] U.S. Cl. .................................................. 521/111
[58] Field of Search .............................. 521/112, 111

[56] References Cited

U.S. PATENT DOCUMENTS

| | | | |
|---|---|---|---|
| 3,418,354 | 12/1968 | Wheeler | 260/448.2 |
| 3,573,334 | 3/1971 | Wheeler | 260/448.2 |
| 4,242,466 | 12/1980 | Schilling | 521/112 |
| 4,797,501 | 1/1989 | Myerly et al. | 556/445 |

FOREIGN PATENT DOCUMENTS 1058385 2/1967 United Kingdom .
2030146 4/1980 United Kingdom .

Primary Examiner—Maurice J. Welsh
Attorney, Agent, or Firm—William F. Gray

[57] ABSTRACT

Novel compositions of silicone/polyether block copolymers are provided which are useful as surfactants in several classes of polyurethane foam production. While conventional copolymers have a polysiloxane backbone with pendant polyethers, the surfactants of the present invention are the reverse with siloxane pendants on a polyether chain. These novel non-hydrolyzable polysiloxane polyoxyalkylene copolymers which are characterized by an "inverted" structure, i.e., polyoxyalkylene backbones with lateral and/or terminally pendant polysiloxanes, represent species that are of a narrow molecular weight and compositional distribution and are free of unreacted polyether or non-modified silicone oil diluent. These surfactants are useful in various urethan foam systems and can also display aqueous wetting properties.

3 Claims, 1 Drawing Sheet

SILICONE POLYETHER COPOLYMERS AND POLYURETHANE FOAMS PREPARED THEREFROM

This application is a division of prior U.S. application Ser. No. 268,187, filing date Nov. 7, 1988, now U.S. Pat. No. 4,962,218.

FIELD OF THE INVENTION

This invention relates in general to silicone polyether copolymers. In one aspect this invention is directed to novel silicone/polyether block copolymers which are useful as stabilizers in polyurethane foam production, particularly rigid foams. In a further aspect, this invention relates to processes for the preparation of the novel copolymers and to polyurethane foams prepared therefrom.

BACKGROUND OF THE INVENTION

The first disclosure of polysiloxane polyoxyalkylene copolymers appears in U.S. Pat. No. 2,834,748. These compositions were of the hydrolyzable type. Subsequently, the first disclosure of non-hydrolyzable polysiloxane polyoxyalkylene copolymers appeared in U.S. Pat. No. 2,846,458. In 1958 the first application of polysiloxane polyoxyalkylene copolymers for the stabilization of urethane foam appeared in British Patent 892,136. These polymers were of the hydrolyzable type. The application of nonhydrolyzable copolymers to the production of urethane foams followed shortly thereafter.

To those skilled in the art, it is known that the purity of non-hydrolyzable silicone polyether compositions used in the stabilization of urethane foams typically suffers due, in part, to the requirement that molar excesses of process polyethers be used to ensure complete consumption of silanic hydrogen from the siloxane intermediate. This requirement arises due to competing side reactions of the olefinically terminated polyether which effectively inactivates a certain proportion of the polyether. Residual silanic hydrogen remaining in the product, as is well known to those skilled in the art, can lead to product inconsistencies and/or defoaming properties in the product when used in urethane foam systems. The use of excess process polyether not only leads to an effectively diluted product, but also increases the cost of manufacture and inhibits facile isolation of copolymeric product (if and when desired).

Unreacted silicones (particularly non-modified cyclics) which are present as part of the thermodynamic equilibrium of species present in an equilibrated poly(dimethyl-methyl hydrogen) siloxane fluid also reduce the purity of the copolymeric products prepared therefrom.

Additionally, the compositions of typical copolymers, as described above, necessarily show a broad molecular weight and compositional distribution, which are partially a function of the nature of the equilibrated siloxane intermediates used. Hence, an application which may effectively require a specific narrow copolymer molecular weight and/or compositional distribution for performance efficacy could be complicated by the presence of a broad distribution. At the very least, the copolymeric structures falling outside the specific narrow molecular weight and/or compositional distribution would serve as an expensive diluent to the specific product and process.

The issue of excess polyether has been addresses in several U.S. Pat. Nos. such as, 3,798,253; 3,957,843; 4,059,605; 4,150,048; 4,160,775 and the like. These patents all follow the common theme of modifying the functional portion of the process polyether so as to minimize the mechanism by which a substantial portion of the polyether is inactivated with regard to its hydrosilation reactivity. This method does allow for a somewhat more pure copolymer devoid of substantial unreacted polyether diluent. Unfortunately, the reactivity of the modified process polyethers in those examples is considerably diminished relative to the unmodified analogs. Additionally, these methods do not address the issue of the broad molecular distribution of the copolymeric species, nor the presence of non-modified silicone species.

The issue of molecular weight and compositional distribution has been discussed in U.S. Pat. No. 4,090,987. The copolymeric structures disclosed were structures in which the polyether pendants in the copolymeric structures were uniformly spaced along the siloxane backbone. These structures were then of a relatively more uniform composition, but due to the nature of the siloxane condensation reaction used, were still composed of a distribution of siloxane species varying in the siloxane degree of polymerization.

Considerable reduction in the level of unreacted non-modified silicones can be achieved via a lard (preferably vacuum) distillation of the silicone lights from either the starting fluid or the copolymer product. Either method is both time consuming and costly and the latter method can jeopardize the integrity of the copolymeric product.

Thus, while a variety of products and technologies are offered in today's silicone surfactant market place which provide a broad spectrum of performance characteristics, few, if any, products are available which have a narrow uni-modal distribution and contain virtually no residual unreacted polyether nor unreacted silicone.

Excluding dimethyl oils occasionally used in HR molded systems, the conventional silicone surfactants are copolymers structurally typified by a silicone backbone (with optional branching) displaying lateral or terminal alkyl, aryl, polyether or other organic pendants.

(I)

wherein $R_1$ and $R_2$ are alkyl, aryl and/or polyether.

Varying the silicone and pendant sizes, the spacing, number and type of pendant(s), the proper diluent, and other subtle structural and compositional features, produces required performance changes needed for particular applications.

Conventional, non-hydrolyzable silicone polyether compositions used in the stabilization of urethane foams are characterized by a polysiloxane backbone (with optional branching) with either terminal and/or lateral polyether pendants. In contrast however, a silicone surfactant has not been reported in the literature having a molecular "inversion" of the surfactant structure, i.e., a polyether backbone with silicone pendants. For purposes of illustration, such compositions can be depicted by the following formula:

(II)

Organic backbones with silane or silicone pendants have been prepared such as those having the recurring units:

(III)          (IV)

These polymers, however, contain either ester or polyethylene oxide-ketal recurring units.

Japanese workers have prepared alkoxysilane pendant polyether-polyester block copolymers having pendant silane groups attached to a polyether backbone through an oxygen atom.

In U.S. Pat. No. 4,514,315 there is disclosed a procedure for grafting ethylenically unsaturated alkylene silanes onto polyalkylene oxide polymers for use in aluminum corrosion inhibitor packages. The amount of silane monomer which was grafted onto the polyalkylene oxide polymer was up to 60 weight percent of the total product.

M. L. Wheeler in U.S. Pat. Nos. 3,418,354 and 3,573,334, disclosed and claimed olefinic silicone-organic graft copolymers which were prepared by the free radical grafting of olefinic silicones to non-crosslinked (i.e., liquid) organic polymers including polyethers. The olefinic silicones contained at least one unsaturated group, and hence the resulting graft copolymers were heavily crosslinked.

In free radical grafting, one would expect some of the unsaturated silicone compounds to react among themselves, forming polymeric compounds. Moreover, since the patentees employ silicones containing at least one unsaturated group, one would also expect grafting with silicones having more than one functionality to crosslink the polyether.

Thus, while the prior art has disclosed structures with silicone pendants from polyester and poly(ethylene oxide-ketal) backbones, and also structures with silanic pendants from polyether or poly(ether-ester) backbones, to date there has been no disclosure in the literature of discreet silicone pendant polyethers which have not been prepared by a free radical process. Hence, as indicated above, since these copolymers have polyether backbones and silicone (or silane) pendants, wherein conventional surfactants have the reverse configuration, they have been termed "inverted surfactants".

Accordingly, one or more of the following objects will be achieved by the practice of the present invention. It is an object of this invention to provide novel siloxane polyether copolymers. Another object of this invention is to provide novel silicone polyether compositions which are block copolymer compositions. A further object is to provide silicone polyether copolymers which are useful as surfactants in the manufacture of polyurethane foams. A still further object of this invention is to provide copolymers which exhibit a polyether backbone with terminal and/or lateral siloxane pendants. Another object is to provide copolymeric product mixtures which contain virtually no residual unreacted polyether nor unreacted silicone and are therefore predominantly copolymer. A further object is to provide copolymeric compositions which are composed of a narrower molecular weight distribution than conventional copolymers. A still further object is to provide copolymeric compositions which are effective stabilizers, particularly for rigid polyurethane foams. Another object is to provide rigid polyurethane foams prepared using the surfactants of the present invention. Processes are also provided for the preparation of the copolymers and the foams. These and other objects will readily become apparent to those skilled in the art in the light of the teachings herein set forth.

SUMMARY OF THE INVENTION

In its broad aspect the present invention relates to silicone polyether copolymers, a method for their preparation and their use as stabilizers in polyurethane foam production, and urethane foams, particularly rigid polyurethane foams resulting therefrom.

As previously indicated, the molecular structures of the copolymers of this invention are the reverse of conventional copolymers utilized in foam production, in that they are characterized by a polyether backbone having at least three silicone pendants of the formula:

wherein R', R", a and b are as hereinafter defined.

The use of these polymers avoids the potential problems and shortcomings associated with unreacted polyether and silicones, and also allows for narrower copolymeric molecular weight and compositional distribution.

DETAILED DESCRIPTION OF THE INVENTION

As indicated above, no silicone surfactants have been reported in the literature having a molecular "inversion" of the surfactant structure, i.e., a polyether backbone with silicone pendants. Formula (II) above, illustrates in a general way a typical recurring unit of a surfactant having such an inverted structure In one aspect, the silicone polyether copolymers of the present invention are obtained by the hydrosilation of a polyether prepared by the copolymerization of ethylene oxide, propylene oxide and allyl glycidyl ether. Such a copolymer can be illustrated by the following random or blocked recurring units:

wherein R represents hydrogen, lower alkyl, acetyl and the like; R' represents C$_1$–C$_3$, R" or OR'''; R" represents and wherein R''' represents C$_1$–C$_3$; W is a divalent group containing at least 2 carbon atoms, preferably 2 to 10, and which may contain at least one heteroatom selected from O, N and S, within or at the end of W which is attached to the polyether; a, b and c are 0 to 3; with c being preferably 2 or 3; and x and y have a value of 0 or a positive integer; and z has an average value of at least 3.

As used throughout the specification and appended claims, the group H—Si≡, is an abbreviation for wherein R', R", R''', a and b are as indicated above. Preferably, the sum of a and b is 3.

The copolymer surfactants of this invention can be prepared by the hydrosilation of an appropriate polyether with a monofunctional siloxane. The polyethers themselves are similar to commercially available polymeric products prepared by the homopolymerization or copolymerization of one or more alkylene oxides, at least some of which contain an olefinically unsaturated group which subsequently can be reacted with the monofunctional siloxane. For example, the polyethers of pre-vulcanized polypropylene oxide (PPO) rubbers which typically contain about 6% AGE and the remainder PO. Included among the many alkylene oxides which can be used in the preparation of the polyethers are ethylene oxide, propylene oxide, butylene oxide, 2,3-epoxybutane, 2-methyl-1,2-epoxypropane, tetrahydrofuran, and the like.

Illustrative alkylene oxides which contain olefinic unsaturation include, but are not limited to, compounds such as, allyl glycidyl ether, vinylcyclohexane monoxide, 3,4-epoxy-1-butene, and the like.

Thus, the polyethers employed in the preparation of the surfactants of the present invention can be illustrated by the following recurring unit:

-continued wherein R$^1$–R$^4$ are hydrogen or lower alkyl, Z represents an hydrocarbon group containing from 1 to 8 carbon atoms and which may contain heteroatoms, such as O, N, and S; d has a value of 0 or 1; n has a value of from 1 to 6, m has a value of 0 or a positive integer, and w has an average value of at least 3.

Homopolymerization and copolymerization of the alkylene oxides is well known in the art for preparing polymers such as the polypropylene oxide rubbers. The polymeric compounds can of course, be prepared as block or random polymers and, if desired, be comprised entirely of units having pendent unsaturated groups. Thus, when the polyether is prepared exclusively from an unsaturated epoxide, such as allyl glycidyl ether, the polymeric backbone will contain a multiplicity of pendent unsaturated groups. Conversely, if only small amounts of the unsaturated epoxide are employed in the preparation of the polyether, then the pendent unsaturated groups will be widely spaced along the polyether backbone, and hence have fewer sites available for attachment of the siloxane groups.

As indicated above, however, the final surfactant must contain on the average at least three siloxane groups. One siloxane yields an AB structure and two siloxanes yield an ABA, neither of which is, by definition, an inverted surfactant. Surfactant compositions will necessarily be comprised of AB and ABA structures, but their contribution to the total composition will decrease as the average number of siloxane pendants rises substantially above 3. Thus, a satisfactory polyether could be prepared from the copolymerization of a mixture containing 94 percent propylene oxide and 6 percent allyl glycidyl ether, provided the average molecular weight of such polyether >5700 g/mol.

The silicone polyether copolymeric surfactants of this invention have an average molecular weight of from about 650 to about 20,000 and have a polyether backbone containing a plurality of pendant silicone-containing groups. The surfactant is characterized by:

(a) a narrow uni-modal distribution;

(b) being essentially free of silicone oils and excess process polyethers; and (c) any unreacted unsaturated groups present on said polyether backbone are optionally deactivated. By a deactivated unsaturated group as used in the present invention is meant a group that has isomerized so that the olefinic unsaturation is no longer in the terminal position. For example, the allyl group can isomerize or be isomerized to a propenyl group, and hence for the purposes of the present invention be considered deactivated with respect to further reactions or providing sites for crosslinking with other polyether chains during normal hydrosilation reaction conditions.

Before discussing the preparation of the silicone polyether copolymers of the present invention, it should be noted that the purity of non-hydrolyzable silicone polyether compositions used in the stabilization of urethane foam typically suffers due to the requirement that molar excesses of process polyethers be used to ensure complete consumption of silanic hydrogen from the siloxane intermediate. This requirement arises due to the competing side reactions of the olefinically terminated polyether which effectively inactivates a certain proportion of the polyether. Residual silanic hydrogen remaining in the product, as is well known to those skilled in the art, can lead to defoaming properties in the product when used in urethane foam systems and also product composition inconsistencies. The use of excess process polyether to overcome this problem not only leads to an effectively diluted product, but also increases the cost of manufacture and inhibits facile isolation of a copolymeric product.

Additionally, the compositions of typical copolymers as described above necessarily show a broad molecular weight and compositional distribution, which is partially a function of the nature of the equilibrated siloxane intermediates used. Hence, an application which may effectively require a specific narrow copolymer molecular weight and/or compositional distribution for specific performance efficacy could be complicated by the presence of a broad distribution. At the very least the copolymeric structures falling outside the specific narrow molecular weight and/or compositional distribution would serve as an expensive diluent to the product and process.

A particularly significant characteristic of the copolymers of the present invention is that, in contrast to the usual polyether copolymers with pendant silicones, they can be prepared having a relatively narrow molecular weight range. Prior to this discovery, there was no precedent for, nor any reason to believe that both high copolymer purity and narrow molecular distribution could be achieved in a single copolymer species. Additionally, there was no reason to believe that inverting the structure of a siloxane polyether copolymer would allow for wetting and urethane foam stabilization.

As previously indicated, the inverted silicone polyether copolymers of the present invention can be conveniently prepared, for example, by the hydrosilation of the appropriate polyether with a monofunctional siloxane. In general, the method used to prepare the various inverted structures of this invention employ various multifunctional polyethers in reaction with several discrete, monofunctional SiH fluids under typical hydrosilation conditions. The multifunctionality of the polyethers was introduced by concurrent alkoxylation of EO and/or PO with allyl glycidyl ether (AGE) or vinyl cyclohexene monoxide (VCM). The monofunctionality of the SiH fluids was ensured by distillation of silicones such as MM', MD'M, M₃T', D₃D' and the like as hereinafter defined.

Typically, the hydrosilations were run without difficulty, often giving sharp exotherms. Solvent levels were often as high as 60% to help control heat dissipation. Solventless preparations were also shown to be feasible, but very exothermic as shown in Example XVII. Stoichiometries of allyl (or vinyl) -to-SiH ranged from 1.3:1.0 to an excess of SiH. At very high ratios, there is lower silicone content and therefore considerable unreacted pendant olefin groups; at very low ratios, there is excess silicone fluid which must be distilled out. An excess of most of the silicones was not a problem in the product since this excess was easily removed via a hard final strip. Even in the presence of excess SiH fluid, however, it was found that these hydrosilations converted less than 90% of the allyl group to the hydrosilated product also dependent upon the exact siloxane). Remaining unsaturation was present as propenyl functionalities. This suggests that allyl-to-propenyl isomerization competes with hydrosilation in these very reactive systems, to an extent similar to that which occurs in conventional surfactant preparations.

Because of the current lack of a suitable simplified nomenclature for the easy identification of structural variations of inverted copolymer structure, Tables I and II are provided in order to teach the important structural perturbations within this invention. Table I documents the multifunctional polyether intermediates. Table II describes the copolymers prepared by the process of the invention along with some supporting analytical data. Examples I-XV and XIX document typical inverted surfactant preparations based on monofunctional SiH fluids and multifunctional polyethers.

Examples XXI-XXII document results of urethane foaming evaluations on H.R. slabstock, rigid and molded H.R. formulations, respectively.

For ease of identification, the surfactants of the present invention are referred to by letter designation where the letters have the following meanings:

| | |
|---|---|
| M | O$_{1/2}$Si(CH$_3$)$_3$ |
| D | (CH$_3$)$_2$SiO$_{2/2}$ |
| D' | (CH$_3$)Si(H)O$_{2/2}$ |
| D" | (CH$_3$)Si(R)O$_{2/2}$ |
| D$_3$ | cyclic dimethyl siloxane trimer |
| D$_4$ | cyclic dimethyl siloxane tetramer |
| D$_3$D' |  O[Si(CH$_3$)$_2$O]$_3$Si(CH$_3$)H |
| D$_4$D' |  O[Si(CH$_3$)$_2$O]$_4$Si(CH$_3$)H |
| MM' | (CH$_3$)$_3$SiOSi(CH$_3$)$_2$H |
| M$_3$T' | [(CH$_3$)$_3$SiO]$_3$SiH |
| MD'M | [(CH$_3$)$_3$SiO]$_2$Si(CH$_3$)H |
| MD$_2$M' | (CH$_3$)$_3$SiO[Si(CH$_3$)$_2$O]$_2$Si(CH$_3$)$_2$H |
| MD$_3$M' | (CH$_3$)$_3$SiO[Si(CH$_3$)$_2$O]$_3$Si(CH$_3$)$_2$H |
| T | CH$_3$SiO$_{3/2}$ |
| Q | SiO$_{4/2}$ |
| "SiH fluid" | poly (dimethyl, methyl-hydrogen) siloxane. |

Figure 1:
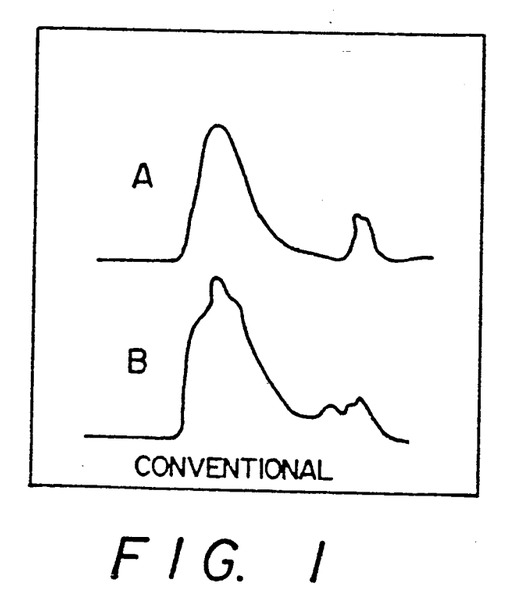
FIG. 1 depicts a gel permeation chromatograph of typical conventional surfactant preceeded by the silicone precursor.
Figure 2:
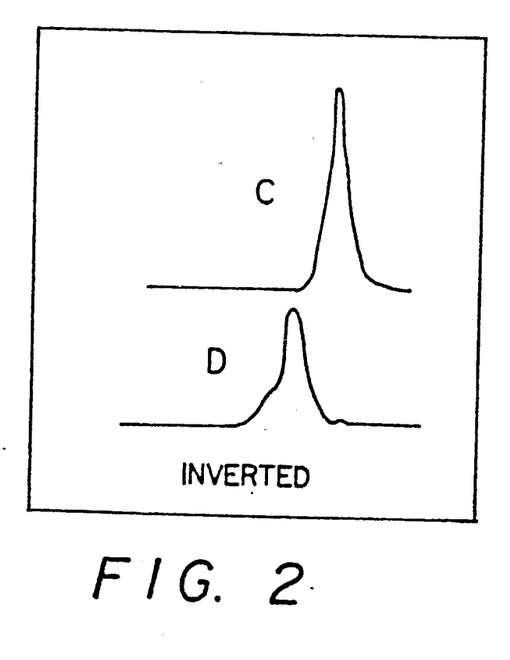
FIG. 2 depicts a gel permeation chromatograph of the surfactant of the present invention, preceeded by the silicone precursor.

The present invention will be more readily understood by reference to the drawings wherein FIG. 1 shows a typical Gel Permeation Chromatogram (GPC) of a conventional copolymer mother liquor below the GPC of its starting SiH fluid backbone in comparison to a typical GPC of an inverted copolymer below the GPC of its starting polyether backbone as shown in FIG. 2. The GPC of a conventional copolymer mother liquor shows a multimodal distribution, whereas the inverted copolymer mother liquors are uni-modal.

In addition to the novel structure itself, which exhibits silicone pendants off a polyether backbone, as opposed to the reverse in conventional surfactant systems, the composition of the mother liquor is also unique.

As can be seen in the chromatogram, the inverted product is represented by a narrow uni-modal distribution. The narrowness (relative to conventional surfactants) is a manifestation of the differences between the backbones of the two systems. A conventional surfactant is based on an equilibrated SiH fluid with a broad compositional distribution. Inverted surfactants, on the other hand, are based on multifunctional polyethers which are "grown" from a starter such as n-butanol. Although not perfectly discrete molecular species, these polyethers are compositionally more uniform than equilibrated SiH fluids, particularly regarding molecular weight distributions. Since these "more uniform" intermediates are being reacted with discrete silicones such as MM', D'D₃, and the like, the relative degree of uniformity is transferred to the inverted surfactant products. This is unlike conventional surfactant systems in which the less uniform SiH fluid backbone composition is reacted with a non-discrete allyl-started polyether to yield an even less uniform product. The distribution of inverted surfactants is therefore expected to be less disperse than that of conventional systems. GPC confirms this from the standpoint of molecular volume (weight) distribution.

A second unique feature of the inverted surfactants of the present invention is the absence of diluent (both silicone oil and excess process polyether) which is present in conventional surfactants free silicone oils (i.e., $D_4$, $D_5$ and the like) are present in conventional systems due to their presence in the equilibrated SiH fluid intermediate.

The bulk of the silicone oils in conventional copolymeric compositions can be removed from the SiH fluid via a hard strip of either the SiH fluid precursor or the final copolymeric product. However, even an efficient strip has been shown to leave linear and cyclic silicone oils larger than about $MD_7M$ and $D_8$. These silicone oils are not present in the inverted systems of the invention provided that the silicone precursor is purified. Since little or no redistribution has been observed during these hydrosilations using appropriate conditions, no silicone oils are produced as by-products and, hence, none exist in the final inverted copolymeric composition.

The excess, unreacted polyether present in conventional systems is a result of required hydrosilation conditions. Generally, a 30% excess of allyl-started polyether must be present in order for a platinum catalyzed hydrosilation to go to completion, based on SiH consumption.

On the other hand, any allyl-to-propenyl isomerization which occurs within a multifunctional polyether serves only to deactivate that unsaturated group; not the whole polyether, as represented below:

wherein H—SI≡ is equivalent to as hereinbefore defined.

Any residual, unreacted silicone SiH fluid causes no problem since those employed here are volatile and are readily removed during the standard solvent strip process.

GPC, $^{13}C$ nmr and $^{29}Si$ nmr were valuable tools in the characterization of the inverted surfactant products. GPC confirmed the absence/presence of crosslinking. In general, careful purification of the silicone intermediate and controlled reaction and workup conditions prevented crosslinked structures.

$^{13}C$ nmr was particularly helpful in monitoring the extent of conversion of the unsaturated groups of the multifunctional polyether after hydrosilation. Complete conversion was typically prevented by the competing allyl-to-propenyl isomerization, although conversions of greater than 80% were frequently observed. In addition, $^{13}C$ nmr was able to document the lack of O-dehydrocondensation chemistry $(SiH + HOR \rightarrow SiOR + H_2)$ during hydrosilation in uncapped multifunctional polyether systems.

The inverted surfactants of the present invention were evaluated in conventional flexible, HR (molded and slabstock) and rigid urethane foam applications. The performance testing procedure involved an initial screening of different inverted silicone surfactants in box pours with final evaluations taking place in an L-panel mold. The L-panel provides an expedient, simple discriminating test by which surfactant performance criteria, such as surface defects, densities, density gradients, K-factores and flowability can be effectively gauged. Performance in these evaluations was judged by the foam density and K-factor (insulating ability). Both fast, such as in spray systems, and slow formulations were employed in these evaluations.

Two conventional rigid foam surfactants sold by the Union Carbide Corporation and identified as L-5420 and L-5440 were employed as a control. All of the inverted surfactant evaluations were performed with either or both of these conventional surfactants as the controls.

Formulations used in these performance evaluations are shown in Table IV. In every case the surfactants (all of them containing uncapped polyether backbones) were introduced on the resin side. Foam results are tabulated in Tables V–VII for the slow formulations and Table VIII for the fast formulations.

As is well known in the art, the production of polyurethane foams, using the surfactants of this invention, requires one or more polyether polyols for reaction with the polyisocyanate reactant to provide the urethane linkage. Such polyols have an average of at least two, and typically 2.0 to 3.5, hydroxyl groups per molecule and include compounds which consist of carbon, hydrogen and oxygen and compounds which may also contain phosphorus, halogen, and or nitrogen. Such polyether polyols are well known in the art and are commercially available.

The organic polyisocyanates that are useful in producing polyether polyurethane foams in accordance with the process of this invention are also well known in the art and are organic compounds that contain at least two isocyanate groups and any such compounds or mixtures thereof can be employed. The toluene diiisocyanates are among many suitable isocyanates which are commercially used in the preparation of foams.

The urethane foaming reaction is usually effected in the presence of a minor amount of a catalyst, preferably an amine catalyst and usually a tertiary amine.

It is also preferred to include a minor amount of certain metal catalysts in addition to the amine catalyst in the component of the reaction mixture. Such supplementary catalysts are well known to the art of polyether-based polyurethane foam manufacture. For example, useful metal catalysts include organic derivatives, of tin, particularly tin compounds of carboxylic acids such as stannous octoate, stannous oleate and the like.

Foaming is accomplished by employing a small amount of a polyurethane blowing agent such as water in the reaction mixture, which upon reaction with isocyanate generates carbon dioxide in situe, or through the use of blowing agents which are vaporized by the exotherm of the reaction or by a combination of the two. These methods are well known in the art. The polyether-based polyuretnane foams of this invention may be formed in accordance with any of the processing techniques known to the art such as, in particular, the "one-shot" technique. In accordance with this method, foamed products are provided by carrying out the reaction of the polyisocyanate and polyether polyol simultaneously with the foaming operation. It is sometimes convenient to add the surfactant to the reaction mixture as a premixture with one or more of the blowing agents, polyether, polyol and catalyst components.

It is understood that the relative amounts of the various components of the foam formulation are not narrowly critical. The polyether polyol and polyisocyanate are present in the foam-producing formulation in a major amount. The relative amounts of these two components in the amount required to produce the desired urethane structure of the foam and such relative amounts are well known in the art. The blowing agent, catalyst and surfactant are each present in a minor amount sufficient to foam the reaction mixture, the catalyst is present in a catalytic amount which is that amount necessary to catalyze the reaction to produce the urethane at a reasonable rate, and the surfactant is present in an amount sufficient to impart the desired properties. The polyurethanes produced in accordance with the present invention can be used in the same areas as conventional polyether and/or polyester polyurethanes. For example, the foams of the present invention can be used with advantage in the manufacture of textile interliners, cushions, mattresses, padding, carpet underlay, packaging, gaskets, sealers, thermal insulators and the like.

In the examples which follow, all reactions involving the manipulation of organometallic compounds were performed in an inert atmosphere. Commercial reagents were used without additional purification. All glassware was washed successively with KOH/iospropanol, water, dilute hydrochloric acid and water and oven dried before use. $^{13}$C NMR spectra were obtained using a Varian CFT-20 spectrophotometer with fourier transform capabilities. $^{29}$Si NMR and additional $^{13}$C NMR spectra were obtained using a JEOL-90Q spectrometer. NMR samples were prepared by dissolving the samples in either deuterochloroform or perdeuterobenzene containing 0.03M Cr(acac)$_3$ relaxation agent. GC analysis were obtained using a Hewlett Packard Model 5840A gas chromatograph fitted with 10 ft. × ⅛ in stainless steel columns packed with OV101 on Chromosorb W. The GC was temperature programmed form 75° C. to 350° C. at a rate of 1 minute and a post hold of 20 minutes using a helium carrier gas flow of 30 cc/min. GPC's were obtained using H.P. 1080A AT R.T. through a $10^4$, $10^3$, 500 and 100A four column set at 1 0% dilution in CHCl$_3$ with 10 ml/min flow rate.

The following examples are illustrative of the invention.

EXAMPLE I

Hydrosilation of MM' with Polyether 13 to Yield Inverted Surfactant IS-5

Into a clean, dry 500 ml 3-neck round bottom flask (3NRBF was placed 85.79 grams of Polyether 13 (16.4% allyl; 3.52% OH (diol); 48% (wt) allyl glycidyl ether (AGE), 24% EO and 28% PO), and 39.21 grams MM' (Petrarch) and 20 grams toluene. This charge represents a 30% excess of allyl groups (relative to SiH) and 60 % toluene. However, it is found that many other similar preparations were successful using a 1:1 stoichiometry and only 30% toluene by weight. The pot was then equipped with a heating mantle, a mechanical stirrer, a thermometer/thermowatch, a Dean-Stark trap with a Friedrich's condensor, N$_2$ inlet/outlet and an N$_2$ sparge tube. A blanket of nitrogen was introduced to the stirred system.

The homogeneous solution was catalyzed with 0.5 ml (15 ppm) of a chloroplatinic acid (CPA)/ethanol solution (10 mg Pt/ml) at 29° C. The pot was warmed to 40° C., at which time an exotherm of 35° C. was observed taking the pot to 75° over the course of one minute. The pot was taken to 100° C. and held for 90 minutes. Neutralization was enacted by adding 5.1 grams. of NaHCO$_3$ and maintaining 100° C. for 3 hours. The solution was filtered through a 3-4u filter pad under 40 psi N$_2$ and collected in another 3NRBF. Toluene was then removed via an N$_2$ sparged strip at 100° C. 110.15 grams of clear brown material was collected (88% yield).

GPC analysis showed a uni-modal product distribution at a lower retention time than the polyether starting material, consistent with a molecular volume increase. $^{13}$C nmr showed typical 1,2 hydrosilation of the allyl group and $^{29}$Si nmr documented the presence of only M and M" type silicon atoms in a 1:1 ratio. The percent silicon was found to be 9.9±0.1% (calculated 10.9% for 100% reaction). This copolymer product was found to lower the surface tension of water to 22.4 dynes/cm at 1% concentration at 25° C.

EXAMPLE II

Hydrosilation of MD'M with Polyether 13 to Yield Inverted Surfactant IS-11

Into a clean, dry 500 ml 3-neck round bottom flask (3NRBF was placed 50.32 grams of MD'M, 74.68 grams of Polyether 13 (16.4% allyl; 3.52% OH (diol); 48% AGE, (wt) allyl glycidyl ether (AGE), 24% EO and 28% PO), and 200 grams toluene. This charge represents a 30% excess of allyl groups (relative to SiH) and 60 % toluene. However, it was found that many other similar preparations were successful using a 1:1 stoichiometry and only 30% toluene by weight.

The pot was then equipped with a heating mantle, a mechanical stirrer, a thermometer/thermowatch, a Dean-Stark trap with a Friedrich's condensor, N$_2$ inlet/outlet and an N$_2$ sparge tube. A blanket of nitrogen was introduced to the stirred system.

The homogeneous solution was catalyzed at 65° C. with 0.4 ml (12 ppm) of a chloroplatinic acid (CPA)/ethanol solution (10 mg Pt/ml). The pot was warmed to 77° C., at which time an exotherm of 20° C. occurred taking the pot to 97° C. over the course of three minutes. The pot was held at 100° C. for 34 minutes. Neutralization was enacted by adding 5.0 grams of NaHCO$_3$. The pot was kept at 100° C. for an additional 125 minutes at which time the solution was cooled to room temperature and pressure filtered through a 1-2u filter pad under 40 psi N$_2$ and collected in another 500 ml 3NRBF. Toluene was then removed via an N$_2$ sparged assisted strip at 100° C. Approximately 115 grams of a pale yellow product was collected (92% yield).

GPC analysis showed a uni-modal product distribution at a lower retention time than the polyether starting material, consistent with a molecular volume increase. $^{13}$C nmr showed typical 1,2 hydrosilation of the allyl group and $^{29}$Si nmr documented the presence of only M and D" units at a 2:1 ratio. This material was shown to lower the surface tension of water to 21.5 dynes/cm at $10^{-1}$% concentration at 25° C.

Example XVI documents a similar MD'M hydrosilation with the acetoxy-capped analog of Polyether 13, namely Polyether 17. Example XVII documents a solventless hydrosilation of MD'M and Polyether 13.

EXAMPLE III

Hydrosilation of Polyether 13 with MD$_2$M' to Yield Inverted Surfactant IS-35

Into a clean 500 ml 3NRBF was placed 29.04 grams of Polyether 13 (16.4% allyl; 3.52% OH (diol); 48% (wt) allyl glycidyl ether (AGE), 24% EO and 28% PO), 35.97 grams of MD$_2$M' (see Example XVI) and 29.19 grams toluene. These charges represent a 1:1 stoichometry of allyl-to-SiH and 30% dilution with toluene.

The pot was equipped as in Example I in preparation for the hydrosilation. The pot contents were ensured of dehydraton via a small amount of N$_2$ sparged-assisted toluene distillation at 90° C. which produced clear, dry toluene distillate. The pot was cooled to 86° C. and the homogeneous solution was catalyzed with 0.3 ml (32 ppm) of CPA/ethanol solution (10 mg Pt/ml). After about one second induction period a rapid 27° C. exotherm resulted taking the pot temperature to 113° C., followed by an immediate browning of the solution. The pot was held at 105° C. for 30 minutes at which time it was neutralized with 10.15 grams of NaHCO$_3$ and held at 105° C. for an 120 minutes. The solution was cooled to 37° C. and filtered through a 1-2μ filter pad under 40 psi N$_2$ and collected in another 500 ml 3NRBF. The toluene was then removed via an N$_2$ sparged-assisted strip at 105° C. GC analysis of the stripped distillate revealed the presence of about 2 grams of unreacted MD$_2$M'. 51.33 grams of a brown non-viscous product was collected (79% yield).

GPC of the product revealed a uni-modal product distribution. $^{13}$C nmr showed typical 1,2 hydrosilation of the allyl group and a small amount of propenyl carbons. $^{29}$Si nmr analysis revealed the presence of only M, D and M" silicone groups in a 1:2:1 ratio. Gravimetric determination of % silicon (elemental) was 14.0±0.3% which is 50% of the theoretical value. Interestingly, $^{13}$C nmr suggests greater than 80% reaction completion. The case for this analytical discrepency is as of yet unresolved.

EXAMPLE IV

Hydrosilation of Polyether 13 with MD$_3$M' to Yield Inverted Surfactant IS-82

Into a clean 500 ml 3NRBF was placed 23.88 grams of MD$_3$M' (see Example XVII , 16.12 grams of Polyether 13 (16.4% allyl; 3.52% OH (diol); 48% (wt) allyl glycidyl ether (AGE), 24% EO and 28% PO), and 17.15 grams toluene. These charges represent a 1:1 stoichiometry of allyl-to-SiH and 30% dilution with toluene.

The pot was equipped as in Example I in preparation for the hydrosilation. The pot contents were ensured of dehydration via a small amount of N$_2$ sparged-assisted toluene distillation at 90° C. which yielded clear, dry toluene distillate. Catalysis was effected by the addition of 0.15 ml (26 ppm) of CPA/ethanol solution (10 mg Pt/ml). After a short induction period, a rapid exotherm of 10° C. was observed taking the pot temperature to 108° C., followed by a browning of the solution. The pot was held at 100° C. for 60 minutes at-which time the solution was neutralized with 5.0 grams of moist (10% water) NaHCO$_3$ and held at 100° C. for an additional 120 minutes. The solution was filtered warm through a 3-4u filter pad under 40 psi N$_2$ and collected in another 500 ml 3NRBF. The toluene was then removed via an N$_2$ sparged-assisted strip at 110° C. 31.71 grams of a brown product was collected (79% yield).

GPC of the product revealed a uni-modal product distribution. $^{13}$C nmr and $^{29}$Si nmr were consistent with the proposed product.

EXAMPLE V

Hydrosilation of M$_3$T' with Polyether 13 to Yield Inverted Surfactant IS-59

Into a clean 250 ml 3NRBF was placed 32.58 grams of M$_3$T" (see Example XVIII), 27.46 grams of Polyether 13 (16.4% allyl; 3.52% OH (diol); 48% (wt) allyl glycidyl ether (AGE), 24% EO and 28% PO), and 26.01 grams toluene. These charges represent a 1:1 stoichiometry of allyl-to-SiH and 30% dilution with toluene. The pot was equipped as in Example I in preparation for the hydrosilation.

The pot was heated to 85° C. and a light N$_2$ sparge was instituted. A small amount of clear (dry) toluene was collected, ensuring dehydrated starting materials. The pot temperature was increased to 108° C., at which time catalysis was affected by the addition of 0.25 ml (29 ppm) of CPA/ethanol solution (10 mg Pt/ml). An exotherm of 4° C. was observed to take the pot to 112° C.. over the course of 3 minutes. Recatalysis with 0.1 ml (12 ppm) of CPA/ethanol solution yielded no further exotherms. Pot contents browned after 20 minutes at 110° C. The pot was held at 110° C. for another 95 minutes to allow reaction completion. The solution was then neutralized with 5.5 grams of moist NaHCO$_3$ and was held at 100° C. for 120 minutes. The solution was then filtered through a 3-4μ filter pad under 40 psi N$_2$ to yield a clear, brown toluene solution. Toluene was removed via an N$_2$ sparge-assisted strip at 100° C. 25.77 grams of a clear, brown product was collected (44.4% yield). GC of the stripped distillate revealed considerable recovered, unreacted M$_3$T'.

GPC of the product revealed typical uni-modal product distribution. $^{13}$C nmr revealed roughly 40% reaction of allyl groups to a 1,2 hydrosilated product, whereas the remainder was isomerized to propenyl functionalities. Gravimetric analysis for Si revealed the presence of 10.3% (100% reaction would translate as 20.6% Si). As a note, all hydrosilations performed with M$_3$T'0 were observed to be roughly as sluggish as this preparation. No doubt the steric bulk of the M$_3$T' unit hinders effective, efficient hydrosilation under the employed conditions. In each case $^{13}$C nmr reveals the presence of only propenyl unsaturation remaining in the product after incomplete reaction. Hence, on the timescale needed of CPA-catalyzed M$_3$T' hydrosilation under these conditions allyl-to-properyl isomerization effectively competes to inactivate the unsaturated groups.

EXAMPLE VI

Hydrosilation of D$_3$D' with Polyether 13 to Yield Inverted Surfactant IS-1

Into a clean 500 ml 3NRBF was placed 55.00 grams of D$_3$D, 70.47 grams of Polyether 13 (16.4% allyl; 3.52% OH (diol); 48% (wt) allyl glycidyl ether (AGE), 24% EO and 28% PO), and 200 grams toluene. These charges represent a 43% excess of allyl groups relative to SiH and a 62% dilution with toluene. However, it was found that many other similar preparations were successful using a 1:1 stoichiometry and only 30% toluene by weight.

The pot was equipped as in Example I and the contents were dehydrated via an N$_2$ sparge-assisted distillation at 105° C. A small amount of water was collected. The pot was cooled to 30° C. and 0.45 ml (14 ppm) of CPA/ethanol solution (10 mg Pt/ml) was added as catalyst. The pot was heated to 70° C. at which time a 21° C. exotherm resulted taking the pot to 91° C. An SiH test, which involves the addition of KOH, ethanol and water, and measuring of the hydrogen gas evolved, revealed no detectable SiH remaining. The pot was held at 95° C. for 95 minutes, at which time neutralization was affected by the addition of 3.0 grams NaHCO$_3$. The neutralization was allowed to proceed for 115 minutes at 95° C.. This hot toluene solution was then filtered through a 3-4u filter pad under 40 psi N$_2$ and collected into another 500 ml 3NRBF. Toluene was removed via an N$_2$ sparge-assisted strip at 95° C., yielding 108 grams of brown product (88% yield).

GPC analysis revealed a uni-modal product distribution. $^{13}$C nmr revealed that 65% of the allyl groups had reacted with silicones producing a 1,2 hydrosilated product. Of the remaining 35% of unreacted unsaturation, 70% existed as allyl and 30% as propenyl functionalities. Gravimetric determination of Si revealed 16.3% in the product (21.1% for complete reaction of all allyl groups with D$_3$D'). This represents a 62 percent of reaction completion and compares favorably to the $^{13}$C nmr data. $^{29}$Si nmr revealed that no observable opening of the cyclic D$_3$D' ring occurred upon hydrosilation to the multifunctional polyether.

This inverted surfactant was shown to lower the aqueous surface tension of water to 23.2 dynes/cm at 1 percent concentrations.

EXAMPLE VII

Hydrosilation of D$_4$D' with Polyether 13 to Yield Inverted Surfactant IS-22

Into a clean 500 ml 3NRBF was placed 53.27 grams of Polyether 13 (16.4% allyl; 3.52% OH (diol); 48% (wt) allyl glycidyl ether (AGE), 24% EO and 28% PO), 71.82 grams of D$_4$D' (distilled to 81% purity; impurities are predominantly non-SiH containing D$_4$ and D$_5$) and 75 grams toluene. These charges represent a 30% excess of unsaturation and 38% toluene. In addition, it was found that a 1:1 stoichiometry (or an excess of D$_4$D') and a 30% dilution in toluene were successfully employed in similar D$_4$D' preparations.

The pot was equipped as in Example I and the contents were dehydrated via an N$_2$ sparge-assisted distillation at 100° C. The distillate was clear and hence the solution was deemed dry. The temperature was lowered to 70° C. and the solution catalyzed with 0.5 ml (25 ppm) of CPA/ethanol solution (10 mg Pt/ml). After heating to 75° C., an exotherm of 33° C. was observed taking the pot to 108° C. over the course of one minute. After about another minute, the clear pot contents browned. The pot was subsequently held at 100° C. for 30 minutes, at which time neutralization was affected by the addition of 4.4 grams NaHCO$_3$. The pot was then held at 100° C. for 120 minutes, after which it was cooled to room temperature. The solution was then filtered through a 3-4u filter pad under 40 psi N$_2$ and collected into another 500 ml 3NRBF. The toluene and residual D$_4$D', D$_4$ and D$_5$ were subsequently removed via a hard N$_2$ sparge-assisted strip at 100° C. over the course of 120 minutes. The strip process was allowed to continue for and additional 15 hours (to ensure volatile silicone removal).

GPC analysis revealed a uni-modal product distribution. $^{13}$C nmr showed 81% conversion of allyl groups to 1,2 substituted products via hydrosilation and 19% conversion to propenyl groups via isomerization. $^{29}$Si nmr revealed that the integrity of the D$_4$D' ring was preserved during the hydrosilation process. Gravimetric analysis gave 15.5% Si compared to a theoretical value of 20.6% Si for complete SiH conversion. This gravimetrically determined Si level represents a 58% conversion of SiH. The origin of the discrepency between the $^{13}$C nmr and the gravimetric Si analysis results is as yet unresolved.

A 1% solution of this inverted copolymer was shown to lower the surface tension of water to 20.7 dyne/cm.

EXAMPLE VIII

Hydrosilation of HSi(OEt)$_3$ with Polyether 5 to Yield Inverted Surfactant IS-42

Into a clean, dry 250 ml 3NRBF was placed 46.16 grams of Polyether 5 (4.2% allyl; 0.45% OH (mono-ol); 13% (wt) allyl glycidyl ether (AGE), 34% EO and 53% PO), and 24.06 grams toluene. The pot was equipped as in Example I and was taken to 95° C., at which time a short N$_2$ sparge-assisted strip revealed the contents to be dehydrated. The contents were cooled to 80° C. and 7.77 grams of HSi(OEt)$_3$ were added. This charge represents a 1:1 stoichiometry of allyl-to-SiH. The pot was catalyzed then with 0.2 ml (26ppm) of CPA/ethanol solution (10mg Pt/ml) at 83° C. After a 5 second induction period, a 10% exotherm was observed taking the pot to 93° C. over the course of two minutes. The pot was held at 90° C. for 10 minutes, after which it was neutralized with 8.4 grams of NaHCO$_2$. The temperature of 90° C. was maintained for an additional 120 minutes. The contents were cooled to 33° C. and filtered through a 3-4 filter pad under 40psi N$_2$ sparge-assisted strip at 90° C. 36.39 grams of a clear, pala yellow, viscous product was collected (67% yield).

The GPC chromatogram of this material revealed a complex profile with some peaks with higher-than-expected molecular weights. Hydrolysis of some of the alkoxysilane groups or transesterification with the secondary hydroxyl capped polyether backbone are envisioned as possible cause of the apparent crosslinking.

Gravimetric analysis gave 2.1% Si in this material. Complete SiH conversion would have yielded a product with 2.4% Si. This represents an 5% reaction conversion of HSi(OEt)$_3$ (no residual, unreacted HSi(OEt)$_3$ was present in the final stripped product). Qualitatively, $^{13}$C nmr showed lower conversion of allyl groups, but a quantitative determination was hampered by the complexity of the spectrum (relating specifically to the overlap of important resonances with those of the polyethers' butyl starter resonances).

EXAMPLE IX

Hydrosilation of HSi(OEt)$_2$Me with Polyether 5 to Yield Inverted Surfactant IS-41

Into a clean, dry 500 ml 3NRBF was placed 09.90 grams of Polyether 5 (4.2% allyl; 0.45% OH (mono-ol); 13% (wt) allyl glycidyl ether (AGE), 34% EO and 53% PO),15.31 grams of HSiMe(OEt)2 and 53.32 grams toluene (30% dilution). These charges represent a 1:1 stoichiometry of allyl-to-SiH groups. The pot was equipped as in Example I in preparation for the hydrosilation step.

The pot was heated to 87° C. and the contents were catalyzed with 0.3 ml (17ppm) of CPA/ethanol solution (10mg Pt/ml). After about a two minute induction period an 6° C. exotherm resulted, taking the pot temperature to 95° C. At this point the clear solution turned from colorless to pale yellow. This was held at 95° C. for 30 minutes and was subsequently neutralized with NaHCO$_3$. The viscosity of the solution was observed to increase shortly after the addition of the NaHCO$_3$. The temperature was maintained at 95° C. for 120 minutes, after which time the contents cooled to 35° C. The solution was subsequently filtered through a 3–4μ filter pad under 40 psi N$_2$ and collected in another 500 ml 3NRBF. Toluene was removed via an N$_2$ sparge-assisted strip at 95° C. 110.68 grams of a clear yellow, highly viscous product was collected (88% yield).

GPC analysis revealed predominantly one band profile at a retention time roughly consistent with the proposed structure. However, some distinct higher molecular weight bands were also observed (to a lesser extent than in Example VIII). It is proposed that as in Example VIII, the higher molecular weight bands are attributable to cross-linked products as a result of a) transesterification of the alkyoxysilane groups with the secondary hydroxyl caps of the polyether and/or b) hydrolysis of the alkoxysilane groups.

EXAMPLE X

Hydrosilation of Polyether 19 with HSiEt$_3$ to Yield Inverted Surfactant IS-44

Into a clean, dry 500 ml 3NRBF was placed 67.30 grams of Polyether 19 (17.1% allyl; MW (gpc)=1800 grams/mole; 51% AGE and 49% EO) and 42.97 grams toluene. This pot was equipped as in Example I. The polyether/toluene solution was dehydrated via an N$_2$ sparge-assisted distillation, at 95° C. which, however, yielded clear, dry toluene. The pot was cooled to 70° C. and 32.70 grams of HSiEt$_3$ was added.

Catalysis was initiated by the addition of 0.3 ml (21ppm) of a CPA/ethanol solution (10mg Pt/ml) at 72° C. The temperature was increased to 89° C. at which time an exotherm of 21° C. was observed taking the pot temperature to 110° C. over the course of three minutes. The contents then darkened to a typical yellow-brown color. The pot was then held at 95° C. for 30 minutes, after which time neutralization was affected by the addition of 14.8 grams of NaHCO$_3$. The solution was then maintained at 95° C. for another 120 minutes, then cooled to temperature. The solution was filtered through a 3–4μ filter pad under 40psi N$_2$ yielding a clear brown solution which was collected in another 500 ml 3NRBF. The toluene was removed from the solution via an N$_2$ sparge-assisted assisted strip at 95° C. The stripped product was collected (68% yield).

GPC analysis of the product revealed a uni-modal product distribution at a shorter retention time than the starting polyether backbone, Polyether 19, consistent with the proposed reaction and increase in molecular weight. Gravimetric analysis revealed 2.0% Si, whereas complete conversion of the silane should have yielded an 8.3% Si value. The observed Si level translates as only a 16% conversion of the silane to hydrosilated product $^{13}$C nmr reveals 38% conversion of allyl to 1,2 hydrosilated product and 62% isomerization of ally to propenyl. The origin of the discrepency between the $^{13}$C nmr and the gravimetric results is as of yet unresolved.

EXAMPLE XI

Hydrosilation of Polyether 18 with MM' to Yield Inverted Surfactant IS-24

Into a clean dry 500 ml 3NRBF was placed 84.76 grams of Polyether 18 (17.1 allyl; MW (gpc)=1020 grams mole; 51% AGE and 49% EO), 40.24 grams of MM' and 75 grams of toluene. These charges represent a 1.3:1 ratio of allyl-to-SiH and 38% dilution in toluene. It was shown later, however, that 1:1 stoichiometrics and 30% dilution in toluene could also be successfully employed.

The pot was equipped as in Example I in preparation for the hydrosilation step and was heated to 52° C. The system was then catalyzed with 0.5 ml (25 ppm) of a CPA/ethanol solution (10mg Pt/ml). After a 10 second induction period a rapid exotherm of 58° C. was observed taking the pot to 110° C. during the course of about 20 seconds. The pot was then held at 100° C. for an additional 45 minutes and was subsequently charged with 4.1 grams cf NaHCO$_3$ for the neutralization process. The pot was held at 100° C. for another 120 minutes.

At this point the solution was cooled to about 40° C. and filtered through a 3–4μ filter pad under 40 psi N$_2$ and collected into another 500 ml 3NRBF. Toluene was then removed via an N$_2$ sparge-assisted strip at 80° C. 113 grams of clear golden-brown product was collected (90% yield).

GPC analysis of the product revealed a uni-modal product distribution at a lower retention time than for the starting polyether backbone, consistent with an increase in molecular weight. Gravimetric analysis of the product showed 1.7% Si whereas 100% conversion would have yielded an Si value of 12.9%. The calculated conversion of MM' to product is then 87.%, based on gravimetric analysis. $^{13}$C nmr analysis shows that 71% of the ally groups were converted by hydrosilation, which corresponds to a 92% conversion of MM', which reasonably closely agrees with the result from gravimetric methods. $^{29}$Si nmr revealed that the only silicon species in the product were M and M' in a 1:1 ratio, as expected. This inverted surfactant was shown to lower the surface tension of water to 22.2 dynes/cm at $10^{-1}$% concentration.

EXAMPLE XII

Hydrosilation of Polyether 7 with MM' to Yield Inverted Surfactant IS-46

Into a clean dry 500 ml 3NRBF was placed 77.13 grams of Polyether 7 (8.19 allyl; MW (gpc)=1640 grams/mole; 22% AGE and 78% EO), and 42.93 grams of toluene. The pot was equipped as in Example I in preparation for the dehydration and hydrosilation steps. The solution was heated to 95° C. and a light $N_2$ sparge was introduced to facilitate distillation. The early distillate was cloudy, indicated the slight presence of water in the system. Distillation was continued until distillate was clear and dry. The solution was then cooled to 45° C., at which time 22.87 grams of MM' was added to the pot creating a cloudy yellow heterogeneous suspension. This charge in MM' is a stoichiometric quantity relative to allyl groups of the polyether.

The temperature of the system was increased to 52° C. and the system was subsequently catalyzed with 0.3 ml (21ppm) of CPA/ethanol solution (10mg Pt/ml). After an induction period of roughly two minutes, an exotherm of 16° C. was observed, taking the pot to 68° C. over the course of 4 minutes. The temperature was then boosted to 100° C. and held for 30 minutes. Neutralization was affected by the addition of $NaHCO_3$, while the temperature was maintained at 100° C. for and additional 125 minutes. The solution was then cooled to 36° C. and filtered through a 3-4μ filter pad under 40psi $N_2$ and collected into another 500 ml 3NRBF. Toluene was removed via an $N_2$ sparge-assisted strip at 95° C. When toluene ceased distilling off, the solution was dropped to room temperature and $N_2$ sparge was allowed to continue for 16 hours. 71.61 grams of a semi-waxy product was collected (72% yield).

GPC analysis of this product revealed a uni-modal product distribution at a lower retention time than that for the starting polyether backbone, consistent with a higher molecular weight. Gravimetric determination of Si yielded 7.1% whereas theoretical percent Si for 100% conversion of MM' corresponds to 8.7%. This indicates that there was actually only 80% conversion of MM', based on gravimetric analysis. $^{13}C$ nmr reveals that 78% of the allyl groups were transformed into 1,2 hydrosilated products and the remaining 22% were isomerized to propenyl. This is consistent with the result suggested by gravimetric analysis.

$^{29}Si$ nmr reveals that there are two predominant types of silicon atoms in the product, M and M', in a ratio of 1.0:0.97. There is also a small amount of $D^1$ type silicon atoms which can be created either by the dehydrocondensation of some of the MM' with the primary hydroxyl tips of the polyether backbone or by siloxane backbone cleavage. The observed ratio of $M:M'':D^1$ is 1.0:0.97:0.06.

EXAMPLE XIII

Hydrosilation of Polyether 1 with MM' to Yield Inverted Surfactant IS-65

Into a clean dry 500 ml 3NRBF was placed 110.89 grams of Polyether 1 (3.52 allyl; MW (gpc)=1050 grams/mole; 12% AGE and 88% EO), 14.10 grams of MM' and 34 grams of toluene. The flask was equipped as in Example I in preparation for the hydrosilation step. The temperature was increased to 85° C., at which point the homogeneous system was catalyzed with 0.45 ml (25ppm) of CPA/ethanol solution (10mg Pt/ml). An immediate exotherm resulted (less than 2 seconds induction period). An ice bath was immediately put around the flask. The maximum exotherm's temperature reached 100° C. within 35 seconds and the solution cleared and browned. The pot was held at 100° C. for 75 minutes at which time 6 grams of moist $NaHCO_3$ (10% water) was added to affect neutralization. The temperature was maintained at 100° C. for an additional 145 minutes. The solution was subsequently filtered hot through a 3-4μ filter pad under 40 psi $N_2$ and collected into another 500 ml 3NRBF. Toluene was removed via an $N_2$ sparge-assisted strip at 110° C. 113.87 grams of product (a wax at room temperature) was collected (91% yield).

GPC analysis revealed a uni-modal product distribution at a lower retention time than the starting polyether backbone, consistent with an increase in molecular weight as expected from the proposed product.

EXAMPLE XIV

Hydrosilation of Polyether 10 with MD'M to Yield Inverted Surfactant IS-72

Into a clean dry 500 ml 3NRBF was placed 91.45 grams of Polyether 10 (6.77 allyl; MW (gpc)=1065 grams mole; 24% VCM and 76% EO), 33.57 grams of MD'M and 53 grams of toluene. These charges represent a 1:1 stoichiometry of allyl-to-SiH and a 30% dilution in toluene. The pot was equipped as in Example I and the contents were heated to 95° C. The solution was catalyzed with 0.45 ml (25ppm) of CPA/ethanol solution (10mg Pt/ml), but no reaction was observed. The system was recatalyzed with another 0.45 ml (25ppm) of CPA after 5 minutes. A 5° C. exotherm was observed. The brown solution was held at 100° C. for 60 minutes, at which time it was neutralized by the addition of 5.5 grams of moist $NaHCO_3$ (10% water). The pot was maintained at 100° C. for an additional 135 minutes. The hot solution was then filtered through a 3-4μ filter pad yielding a clear, light brown solution which was collected in another 500 ml 3NRBF. Toluene was removed via a $N_2$ sparge-assisted strip at 110° C. 106.67 grams of product (very viscous/semi-wax) were collected (85% yield). GPC analysis revealed a uni-modal product distribution at a retention time lower than the starting polyether backbone, consistent with an increase in molecular weight as expected for the proposed product. The presence of a finite level of toluene was also observed in this product, indicating an incomplete strip.

EXAMPLE XV

Hydrosilation of Polyether 21 with MM' to Yield Inverted Surfactant IS-83

Into a clean dry 250 ml 3NRBF was placed 33.15 grams of Polyether 21 (34.9 allyl; MW (gpc)=1050 grams/mole; 97% AGE and 3% EO) and 53 grams of toluene. These charges represent a 1:1 stoichiometry and 60% toluene. The high toluene levels are used as a safe-guard against the expected high reaction exothermicity. The pot was equipped as in Example I in preparation for the hydrosilation step. The system was heated to 70° C., encased in an ice bath, and immediately charged with 0.30 ml (28ppm) of CPA/ethanol solution (10mg Pt/ml). An immediate exotherm raised the pot temperature to 105° C. (a 35° C. exotherm). The pot contents slowly turned from yellow to brown. A temperature of 100° C. was maintained for 60 minutes at which time neutralization was affected by the addition of 5.5 grams of moist NaHCO$_3$ (10% water).

The pot temperature was maintained another 120 minutes at 100° C. The contents were then filtered warm through a 3-4μ filter pad under about 40 psi N$_2$ into another 500 ml 3NRBF yielding a clear, dark brown solution. Toluene was removed via a rigorous N$_2$ sparge-assisted strip at 100° C. 58.56 grams of clear, dark brown product was collected (78% yield).

GPC analysis yielded a uni-modal product distribution with a shorter retention time than polyether 21, consistent with an increase in molecular weight as in the proposed product. This reaction, if gone to theoretical completion, places an MM' group at nearly every ether linkage along the chain (except at the ethylene glycol starter unit).

EXAMPLE XVI

Hydrosilation of Polyether 17 with MD'M to Yield Inverted Surfactant IS-15

Into a clean, dry 500 ml 3NRBF was placed 37.13 grams of Polyether 17 (15% allyl; diacetoxy capped; 0% OH; 48% AGE, 24% EO and 28% PO), 22197 grams MD'M and 150 grams toluene. These charges represent a 1.3:1 ratio of allyl-to-SiH and a 70% dilution in toluene.

The pot was equipped as in Example I and the contents were heated to 100° C. The contents were dehydrated via an N$_2$ sparge-assisted distillation which revealed the distillate to be clear and dry. The temperature was lowered to 80° C. and catalyzed with 0.4 ml (19 ppm) of CPA/ethanol solution (10 mg Pt/ml). After a 30 second induction period, an exotherm of 13° C. was observed taking the pot to 93° C. over the course of about 3 minutes. After another 4 minutes the pot contents darkened. The temperature was maintained at 100° C. for 105 minutes and was neutralized with 5.2 grams of NaHCO$_3$. The temperature was held at 100° C. for an additional 190 minutes.

The solution was cooled to room temperature and filtered through a 1-2μ filter pad under 40 psi N$_2$ into another 500 ml 3NRBF. Toluene was removed by an N$_2$ sparge-assisted strip at 80° C. 53 grams of clear yellow product was collected (88% yield).

GPC analysis revealed a uni-modal product distribution. Gravimetric determination of Si revealed 14.5% Si. Complete conversion of the MD'M would theoretically yield 15.4% 14.5% Si represents 91% conversion of MD'M present. The remaining MD'M was removed in the final strip step. A 1% concentration of this capped inverted surfactant lowered the surface tension of water 24.9 dyne/cm.

EXAMPLE XVII

The Solventless Hydrosilation of MD'M with Polyether 13 to Yield Inverted Surfactant IS-11

Into a clean, dry 250 ml 3NRBF was placed 40.00 grams of Polyether 13 16.4 % allyl; 3.52% OH; 48% AGE; 24% EO; 18% PO) and 35.57 grams of MD'M. These charges represent a 1:1 stoichiometry of allyl-to-SiH.

The pot contents were heated to 86° C. and catalyzed with 0.2 ml (26 ppm) of CPA/ethanol solution (10 mg Pt/ml). After 5 minutes, and no evidence of reaction, the pot was recatalyzed with another 0.2 ml (26 ppm) of CPA/ethanol solution. Following a short induction period, an exotherm of 36° C. was observed taking the pot to 112° C. even though the vessel had been placed into an ice bath early in the exotherm. The pot immediately cleared and browned. The temperature was reduced to and maintained at 100° C. for 60 minutes, at which time the pot contents were neutralized with 5.5 grams of moist NaHCO$_3$ (10% water). The pot was held at 100° C. for an additional 150 minutes, after which the contents were filtered warm through a 3-4μ filter pad. 62.22 grams of product were collected (82% yield). GPC revealed a small amount of unreacted MD'M. However, the GPC chromatogram of the copolymeric region (uni-modal distribution) was qualitatively identical to the GPC chromatogram of the product from Example II.

EXAMPLE XVIII

Hydrosilation of Polyether 18 with HSi(OMe)$_3$ to Yield a Hydrolytically Unstable Inverted Surfactant IS-81

Into a clean, dry 500 ml 3NRBF was placed 90.08 grams of Polyether 18 (17.1% allyl; MS(gpc)=1020 gram/mol; 51% AGE and 49% EO; 80% priamary hydroxyl tip by $^{13}$C nmr), 35.12 grams of-HSi(OEt)$_3$ and 175 grams toluene. These charges represent a 30% excess of allyl groups (relative to SiH) and 58 % dilution in toluene. The pot was equipped as in Example I in preparation for the hydrosilation step. The pot was then catalyzed at 20° C. with 0.5 ml (17 ppm) of a CPA/ethanol solution (10 mg Pt/ml). The pot was externally heated to 110° C. and was recharged with 16.0 grams of HSi(OEt)$_3$ and recatalyzed with CPA. No observable exotherm was generated. The system was neutralized with NaHCO$_3$, held at 100° C. for 120 minutes and filtered under 40 psi N$_2$. Toluene stripping via N$_2$ sparge-assisted distillation was begun at 75° C. However, the pot contents gelled during the strip. A transesterification of the methoxyl groups and the primary hydroxyl groups of the polyether is proposed as the crosslinking chemistry that has occurred in the system.

EXAMPLE XIX

Hydrosilation of Polyether 9 with HSi(OEt)$_3$ and HSi(OEt)$_2$Me to Yield two Hydrolytically Unstable Inverted Surfactants IS-62 and IS-63 Respectively Into a clean 500 ml 3NRBF were placed the following charges:

| Reactor: | A (gm) | B (gm) |
| --- | --- | --- |
| Polyether 9 | 82.13 | 79.95 |
| HSi(OEt)$_3$ | 25.41 | — |
| HSi(OEt)$_2$Me | — | 20.88 |

| Reactor: | A (gm) | B (gm) |
|---|---|---|
| Toluene | 46.86 | 43.66 |

(Polyether 9: 7.67% allyl; MW(gpc)=4230 gm/mol; 22% AGE; and 78% EO; 90% primary hydroxyl tip by 13C nmr). In both cases, these charges represent a 1:1 stoichiometry of allyl and SiH and 30% dilution in toluene. The pot was equipped as in Example I in preparation for hydrosilation. The pots were heated to 90° C. and were subsequently charged with 0.3 ml (19 ppm) of a CPA/ethanol solution (10 mg Pt/ml). In both reactions, a 10 second induction period was followed by an 8° C. exotherm taking the contents to 98° C. The contents of reaction A gelled in 3 minutes and the contents of reaction B gelled in 2 minutes. As in Example XXI, the presence of primary hydroxyl groups of the polyethers is presumed to readily transesterify with the ethoxyl groups of the silane to afford a highly crosslinked system responsible for the gellation.

EXAMPLE XX

Hydrosilation of Polyether 18 with $MD_{13}D'_{5.2}M$

One attempt was made to form a 1:1 adduct of a multifunctional polyether and a SiH fluid. The polyether was Polyether 18 which has a nominal molecular weight of 1020 grams and an average functionality of 4.5. The silicone was $MD_{13}D'_{5.5}M$ with and average functionality of about 5.5. The approach was to use reaction conditions which would most favor formation of 1:1 adducts, if possible.

It was recognized that crosslinking could not be completely avoided due to the compositional variations of both polyethers and silicones which would preclude the formation of only 1:1 adducts even under the optimum circumstances. Nonetheless, conditions were used (high dilution) which would favor 1:1 adducts to the extent possible. The likelihood for failure for this experiment was considered high from the start due to the requirement needed for success. Into a 1000 ml 3NRBF was place 19.03 grams of Polyether 18 (17.1% allyl; MW(gpc)=1020 gram/mol; 51% AGE and 49% EO; diol) 17.51 grams of $MD_{13}D'_{5.5}M$ and 331.0 grams toluene. These charges represent a 30% excess of allyl groups relative to SiH, and a 70% dilution via toluene.

The flask was equipped as in Example I in preparation for hydrosilation.

The solution was heated to 95° C., whereupon it was catalyzed with 0.9 ml(25 ppm) of CPA/ethanol solution (10 mg Pt/ml). After a short induction period, an exotherm of about 7° C. resulted. Within 10 minutes, however, the entire pot contents gelled, in spite of the large dilution in toluene. No further workup of the material was undertaken.

EXAMPLE XXI

Evaluation of Surfactants

Three inverted surfactants (IS-15, IS-22 and IS-59) were evaluated in two HR slabstock formulations. The formulations are shown below:

| Component | Parts A | Parts B |
|---|---|---|
| Polyol E-547 | 100.0 | 100.0 |
| H₂O | 3.2 | 3.2 |
| DEOA | 0.8 | 0.8 |
| C-183 | 0.15 | 0.15 |
| T-12 | 0.05 | 0.05 |
| TDI (110 index) | 41.0 | 38.8 |
| Surfactant | 0.2 | 0.2 |

The results are shown below:

| Surfactant | Formulation | Cream Time (sec) | Rise Time (sec) | Top Collapse (in) | Shrinkage | Cells |
|---|---|---|---|---|---|---|
| 59 | A | 7-8 | 138 | 0 | slight | good |
|  | B | " | 60 | TOTAL COLLAPSE | | |
| 22 | A | " | 141 | 0 | severe | good |
|  | B | " | 90 | 0.15 | none | good |
| 15 | A | " | 140 | 0 | severe | good |
| L-5309 | A | " | 123 | 0 | none | good |

EXAMPLE XII

Evaluation of Inverted Surfactants

In all, 39 inverted surfactants and their blends were evaluated in several rigid urethane foam formulations. The formulations are shown in the following table. The results are shown in Tables III–IV.

| | Rigid Foam Formulations | | | | |
|---|---|---|---|---|---|
| | Parts (pphp) | | | | |
| Component | 1 | 2 | 3 | 4 | 5 |
| Polyol PIP-375 | 100 | 100 | 100 | — | — |
| Polyol LS-490 | — | — | — | 100 | 100 |
| Water | 0.6 | 0.6 | 0.6 | 1.0 | 1.0 |
| DMEA | 0.6 | 1.0 | 1.0 | — | — |
| TMBDA | — | — | — | 1.50 | 5.0 |
| T-12 | 0.04 | 0.12 | 0.12 | — | — |
| NBA-11C | 54.0 | 54.0 | 54.0 | 42.0 | 42.0 |
| Rubinate M | 107.6 | 107.6 | 107.6 | 141 | 141 |
| Surfactant | varied | varied | varied | varied | varied |

EXAMPLE XXIII

Molded High Resilience Urethane Foam Application

The performance testing procedure involved in initial screening of a dozen different inverted silicone polyether copolymers using the standard QC hot mold formulation. Ingredients of the formulation and foaming conditions are documented in the following table.

TABLE III

| HR Standard QC Formulation and Conditions | | |
|---|---|---|
| Ingredient | Parts | Mass |
| TDI (102I) 80/20 | 36.8 | 184 |
| Polyol 12-35 | 50.0 | 250 |
| Polyol 34-28 | 50.0 | 250 |
| Water | 3.0 | 15.0 |
| A-1 | 0.1 | 0.5 |
| Dabco/33LV | 0.5 | 2.5 |
| DEOA | 0.9 | 4.5 |
| Surfactant | Variable | Variable |
| Conditions: Mold Temperature: | 130° F. | |
| Vent Holes: | 5 | |
| Mold Dimensions: | 15"/15"/4" (AL) | |
| Control Surfactant: | L-5309 | |

The surfactants were evaluated on their ability to stabilize fine cell structure without pad shrinkage. Low end and high end surfactant operating ranges (minimum and maximum surfactant concentrations which stabilize the foam and cause very slight shrinkage, respectively) were determined in the systems which showed some measure of promise.

Of those inverted surfactants studied, several showed promise. These contained MM' and MD'M as pendants. Typical problems were severe shrinkage (pad tightness) at the concentrations necessary for the cell stabilization and, consequently, very narrow concentration latitudes.

TABLE IV

| | | Foam Results in 15" × 4" Mold | | |
|---|---|---|---|---|
| I.S. | Pendant Silicone | Range of Copolymer | Range of Control* | Cell Structure |
| 1 | $D_3D'$ | 0.25-0.35 | 0.375-5.0 | fine |
| 5 | MM' | 0.20-0.30 | ... | fine |
| 9 | MM' | 0.25# | ... | |
| 10 | $D_3D'$ | 0.15-0.25 | ... | fine |
| 11 | MD'M | 0.25# ... severe shrinkage | | |
| 15 | MD'M | 0.15-0.40 | ... | fine |
| 20 | MD'M | 0.25# | 0.375-5.0 | fine |
| 24 | MM' | 0.25-0.28 | ... | fine |
| 36 | $MD_2M'$ | 0.10-0.25 | 0.375-5.0 | fine |

*L-5309 control
range not indentified

EXAMPLE XXIV

Measurement of Aqueous Surface Tension Reductions Using Selected Inverted Surfactants In this example, the aqueous surface tension reductions of various inverted surfactants prepared by the process of the present invention were determined. The results obtained are set forth in Table A below:

TABLE A

| Aqueous Surface Tension Reductions of Inverted Surfactants# | | |
|---|---|---|
| Surfactant | (dynes cm-2) | Approximate CMS* |
| 1 | 23.2 (0.1%) | $1 \times 10^{-2}$ |
| 2 | 23.2 (0.1%) | $1 \times 10^{-2}$ |
| 3 | 24.6 | $1 \times 10^{-2}$ |
| 4 | 23.3 (0.1%) | $1 \times 10^{-2}$ |
| 5 | 22.4 | $5 \times 10^{-2}$ |
| 6 | 24.7 | $1 \times 10^{-1}$ |
| 7 | 22.8 | $5 \times 10^{-2}$ |
| 8 | 25.1 | $1 \times 10^{-2}$ |
| 9 | 26.3 | $1 \times 10^{-2}$ |
| 11 | 21.5 (0.1%) | $5 \times 10^{-3}$ |
| 13 | 23.8 | $1 \times 10^{-3}$ |
| 14 | 22.9 | $1 \times 10^{-3}$ |
| 15 | 24.9 | $1 \times 10^{-2}$ |
| 20 | 22.6 (0.1%) | $1 \times 10^{-2}$ |
| 21 | 20.8 | $5 \times 10^{-2}$ |
| 24 | 22.2 (0.1%) | $5 \times 10^{-2}$ |
| 25 | 22.6 | $1 \times 10^{-1}$ |
| 26 | 22.3 | $5 \times 10^{-2}$ |
| 31 | 20.7 | $1 \times 10^{-2}$ |
| 35 | 23.0 (0.1%) | $5 \times 10^{-2}$ |
| 61 | 20.2 | $1 \times 10^{-2}$ |

At 1% dilution unless noted in parentheses
*In % dilution. CMC = Critical Micelle Concentration

EXAMPLE XXV

Contact Angle Measurements

A comparison was made of the aqueous contact angle between a known surfactant, SILWET-L-77, sold by Union Carbide Corporation, and typical inverted surfactants (I.S.) of the present invention.

The results are set forth in Table B

TABLE B

| Aqueous Contact Angles (in degrees)* | | | | | |
|---|---|---|---|---|---|
| I.S. # | MW | % Si | 0.1% soln. | 1.0% soln. | Silicone Structure |
| L-77 | 600 | 14.4 (12.0) | 14 | 12 | MD"M |
| 20 | 1900 | 15.3 | 16 | 10 | MD"M |
| 21 | 3300 | 15.4 | 30 | 16 | MD"M |
| 23 | 6200 | 15.5 | 39 | 34 | MD"M |

*Measured using a Rame Hart Contact Angle Goniometer.
Actual is 12.0%; calculated for copolymer (excluding excess polyether) is 14.4%.

TABLE I

| | Multifunctional Polyethers Used In This Study | | | | | | | |
|---|---|---|---|---|---|---|---|---|
| | $R-EO_x-PO_y-L_z-OR$ Structure Designations | | | | | | | |
| POLYETHER I.D. | X | Y | Z | L GROUP | OXIDE: LINK | R | R' | MW: gpc |
| 1 | 20 | 0 | 1.1 | AGE | 18.2 | H | H | 1050 |
| 2 | 69 | 0 | 3.7 | AGE | 18.6 | H | H | 3470 |
| 3 | 100 | 0 | 5.3 | AGE | 18.9 | H | H | 5020 |
| 4 | 170 | 0 | 9.1 | AGE | 18.7 | H | H | 8640 |
| 5 | 35 | 41 | 5.1 | AGE | 14.9 | n-Bu | H | 4500 |
| 6 | 19 | 23 | 2.9 | AGE | 14.5 | n-Bu | H | 2500 |
| 7 | 29 | 0 | 3.2 | AGE | 9.1 | H | H | 1640 |
| 8 | 51 | 0 | 5.5 | AGE | 9.3 | H | H | 2850 |
| 9 | 75 | 0 | 8.2 | AGE | 9.1 | H | H | 4230 |
| 10 | 18 | 0 | 2.1 | VCM | 8.6 | H | H | 1065 |
| 11 | 34 | 0 | 3.8 | VCM | 8.9 | H | H | 1970 |
| 12 | 57 | 0 | 6.3 | VCM | 9.0 | H | H | 3280 |
| 13 | 4 | 3.6 | 3.1 | AGE | 2.5 | H | H | 740 |
| 14 | 7.1 | 6.3 | 5.6 | AGE | 2.4 | H | H | 1300 |
| 15 | 10 | 9.2 | 8 | AGE | 2.4 | H | H | 1900 |
| 16 | 12 | 11 | 9.3 | AGE | 2.5 | H | H | 2200 |
| 17 | 4 | 3.6 | 3.1 | AGE | 2.5 | Ac | Ac | 1050 |
| 18 | 11 | 0 | 4.6 | AGE | 2.4 | H | H | 1020 |

TABLE I-continued

Multifunctional Polyethers Used In This Study
$R-EO_x-PO_y-L_z-OR$ Structure Designations

| POLYETHER I.D. | X | Y | Z | L GROUP | OXIDE: LINK | R | R' | MW; gpc |
|---|---|---|---|---|---|---|---|---|
| 19 | 20 | 0 | 8.1 | AGE | 2.5 | H | H | 1800 |
| 20 | 37 | 0 | 15 | AGE | 2.5 | H | H | 3350 |
| 21 | 0.7 | 0 | 8.9 | AGE | 0.1 | H | H | 1050 |

*Where possible, structures have been determined based upon:
(1) knowledge of oxide charges,
(2) gpc information
(3) $^1$H and $^{13}$C nmr results, and/or
(4) % hydroxyl and % unsaturation analyses.
AGE = allylglycidyl ether; VCM = vinylcyclohexene monoxide.

TABLE II

INVERTED SURFACTANTS FROM THIS STUDY.
$R-EO_x-PO_y-L''_z-L_v-OR$ STRUCTURES AND SUPPORTING ANALYTICAL DATA

| I.S. # | SILICONE | POLYETHER | % RXN | x | y | z | v | R | R' | MW Target | MW gpc | MW OH# | % Si Target | % Si Grav |
|---|---|---|---|---|---|---|---|---|---|---|---|---|---|---|
| 1 | D$_3$D' | 13 | 65 | 4 | 3.6 | 2.1 | 1 | H | H | 1615 | 1210 | 1790 | 21.6 | 16.3 |
| 2 | D$_3$D' | 14 | 66 | 7.1 | 6.3 | 3.7 | 1.9 | H | H | 2880 | | 3120 | 21.6 | |
| 3 | D$_3$D' | 15 | 71 | 10 | 9.2 | 5.7 | 2.3 | H | H | 4160 | 2940 | 4470 | 21.6 | |
| 4 | D$_3$D' | 16 | 60 | 12 | 11 | 5.6 | 3.7 | H | H | 4830 | 3430 | 4150 | 21.6 | 9.9 |
| 5 | MM' | 13 | 79 | 4 | 3.6 | 2.4 | 0.7 | H | H | 1200 | 1250 | | 14.5 | |
| 6 | MM' | 14 | 77 | 7.1 | 6.3 | 4.3 | 1.3 | H | H | 2130 | 2180 | | 14.5 | |
| 7 | MM' | 15 | 78 | 10 | 9.2 | 6.2 | 1.8 | H | H | 3090 | 3050 | | 14.5 | 10.1 |
| 8 | MM' | 16 | 72 | 12 | 11 | 6.7 | 2.6 | H | H | 3580 | 3680 | | 14.5 | 15.8 |
| 9 | MM' | 17 | 79 | 4 | 3.6 | 2.4 | 0.7 | Ac | Ac | 1510 | 1370 | | 11.5 | |
| 10 | D$_3$D' | 17 | 71 | 4 | 3.6 | 2.2 | 0.9 | Ac | Ac | 1930 | 1500 | | 18.1 | |
| 11 | MD'M | 13 | 79 | 4 | 3.6 | 2.4 | 0.7 | H | H | 1430 | 1440 | | 18.4 | |
| 12 | MD'M | 14 | 76 | 7.1 | 6.3 | 4.3 | 1.3 | H | H | 2540 | 2430 | | 18.4 | |
| 13 | MD'M | 15 | 80 | 10 | 9.2 | 6.4 | 1.6 | H | H | 3680 | 3350 | | 18.4 | |
| 14 | MD'M | 16 | 81 | 12 | 11 | 7.5 | 1.8 | H | H | 4270 | 3900 | | 18.4 | |
| 15 | MD'M | 17 | | 4 | 3.6 | | | Ac | Ac | 1740 | 1500 | | 15.0 | |
| 16 | D$_4$D'(a) | 13 | 80 | 4 | 3.6 | 2.5 | 0.6 | H | H | 1850 | 1600 | | 23.6 | |
| 17 | D$_4$D'(a) | 15 | 78 | 10 | 9.2 | 6.2 | 1.8 | H | H | 4750 | 3600 | | 23.6 | |
| 18 | D$_4$D'(a) | 16 | 79 | 12 | 11 | 7.3 | 2 | H | H | 5520 | 4100 | | 23.6 | |
| 19 | D$_4$D'(a) | 17 | 79 | 4 | 3.6 | 2.4 | 0.7 | Ac | Ac | 2160 | 1630 | | 20.2 | |
| 20 | MD'M | 18 | 66 | 11 | 0 | 3 | 1.6 | H | H | 2040 | 1640 | | 19.0 | 15.3 |
| 21 | MD'M | 19 | 86 | 20 | 0 | 7 | 1.1 | H | H | 3600 | 2800 | | 19.0 | 15.4 |
| 22 | D$_4$D' | 13 | 79 | 4 | 3.6 | 2.5 | 0.6 | H | H | 1850 | 1890 | | 23.6 | 15.5 |
| 23 | MD'M | 20 | 70 | 37 | 0 | 11 | 4.5 | H | H | 6680 | 4700 | | 18.9 | 20.3 |
| 24 | MM' | 18 | 71 | 11 | 0 | 3.3 | 1.3 | H | H | 1700 | 1560 | | 15.2 | 11.7 |
| 25 | MM' | 19 | 79 | 20 | 0 | 6.4 | 1.7 | H | H | 3000 | 2600 | | 15.2 | 11.1 |
| 26 | MM' | 20 | 76 | 37 | 0 | 11 | 3.6 | H | H | 5570 | 4270 | | 15.2 | 12.4 |
| 27 | M$_3$T' | 18 | | 11 | 0 | 1 | 3.6 | H | H | 2380 | 1400 | | 21.7 | |
| 28 | M$_3$T' | 18 | 29 | 11 | 0 | 1.3 | 3.3 | H | H | 2380 | | | 21.7 | 9.6 |
| 29 | M$_3$T' | 19 | 30 | 20 | 0 | 2.4 | 5.7 | H | H | 4200 | 1820 | | 21.7 | 10.9 |
| 30 | M$_3$T' | 20 | 36 | 37 | 0 | 5.4 | 9.6 | H | H | 7800 | 3760 | | 21.7 | 12.2 |
| 31 | D$_4$D' | 13 | | 4 | 3.6 | 2.9 | 0.2 | H | H | 1850 | | | 23.6 | 24 |
| 32 | D$_4$D' | 18 | 82 | 11 | 0 | 3.8 | 0.8 | H | H | 2660 | 1660 | | 24.3 | 23.7 |
| 33 | D$_4$D' | 19 | 100 | 20 | 0 | 8.1 | 0 | H | H | 4690 | 2700 | | 24.3 | 23.1 |
| 34 | MD'M | 5 | 100 | 35 | 41 | 5.1 | 0 | Bu | H | 5630 | 4600 | | 6.9 | 5.11 |
| 35 | MD$_2$M' | 13 | 78 | 4 | 3.6 | 2.4 | 0.7 | H | H | 1660 | 1725 | | 21.7 | 14 |
| 36 | MD$_2$M' | 18 | 58 | 11 | 0 | 2.7 | 1.9 | H | H | 2380 | 1795 | | 20.6 | 3.5 |
| 37 | MD$_2$M' | 19 | 80 | 20 | 0 | 7.8 | 1.9 | H | H | 4200 | 3084 | | 20.6 | 14.2 |
| 38 | MD$_2$M' | 15 | 81 | 10 | 9.2 | 6.5 | 1.5 | H | H | 4270 | 3960 | | 21.6 | 13.3 |
| 39 | MD$_2$M' | 20 | 80 | 37 | 0 | 12 | 3 | H | H | 7800 | 5160 | | 20.6 | 14.5 |
| 40 | (EtO)$_3$SiH | 13 | | 4 | 3.6 | | | H | H | 1210 | | | | |
| 41 | (EtO)$_2$SiMeH | 5 | | 35 | 41 | | | Bu | H | 5140 | 5095 | | 2.8 | |
| 42 | (EtO)$_3$SiH | 5 | 29 | 35 | 41 | 1.5 | 3.6 | Bu | H | 5280 | 5370 | | 2.7 | 2.14 |
| 43 | Et$_3$SiH | 20 | 38 | 37 | 0 | 5.7 | 9.3 | H | H | 4910 | 3810 | | 8.6 | 2.9 |
| 44 | Et$_3$SiH | 19 | 28 | 20 | 0 | 2.3 | 5.8 | H | H | 2640 | 1820 | | 8.6 | 2 |
| 45 | MD'M | 7 | 73 | 29 | 0 | 2.3 | 0.9 | H | H | 2350 | 1750 | | 12.0 | 9.31 |
| 46 | MM' | 7 | 78 | 29 | 0 | 2.5 | 0.7 | H | H | 2110 | 1675 | | 8.7 | 7.1 |
| 47 | D$_4$D' | 7 | 95 | 29 | 0 | 3 | 0.2 | H | H | 2780 | 1870 | | 16.4 | 16.57 |
| 48 | MM' | 8 | 76 | 51 | 0 | 4.2 | 1.3 | H | H | 3660 | 2700 | | 8.7 | 6.74 |
| 49 | MD'M | 8 | 100 | 51 | 0 | 5.5 | 0 | H | H | 4070 | 2835 | | 12.0 | 9.67 |
| 50 | D$_4$D' | 8 | 95 | 51 | 0 | 5.2 | 0.3 | H | H | 4810 | 2925 | | 16.4 | 15.41 |
| 51 | MD'M | 9 | 73 | 75 | 0 | 6 | 2.2 | H | H | 6050 | 4644 | | 12.0 | 9.5 |
| 52 | D$_{40}$' | 9 | 90 | 75 | 0 | 7.4 | 0.8 | H | H | 7150 | 4960 | | 16.4 | 14.14 |
| 53 | MM' | 9 | 85 | 75 | 0 | 7 | 1.2 | H | H | 5450 | 4140 | | 8.7 | 6.86 |
| 54 | MD$_2$M' | 9 | 75 | 0 | | | | H | H | 6660 | 4100 | | 13.8 | 9.12 |
| 55 | MD$_2$M' | 7 | 29 | 0 | | | | H | H | 2590 | 1600 | | 13.8 | 9.12 |
| 56 | MD$_2$M' | 8 | 85 | 51 | 0 | 4.7 | 0.8 | H | H | 4480 | 2780 | | 13.8 | 11.8 |
| 57 | M$_3$T' | 7 | 27 | 29 | 0 | 0.9 | 2.3 | H | H | 2590 | 1170 | | 13.8 | 10.4 |
| 58 | M$_3$T' | 8 | 31 | 51 | 0 | 1.7 | 3.8 | H | H | 4480 | 1940 | | 13.8 | 4.8 |
| 59 | M$_3$T' | 13 | 30 | 4 | 3.6 | 0.9 | 2.2 | H | H | 1660 | 900 | | 13.8 | 4.8 |
| 60 | M$_3$T' | 9 | 25 | 75 | 0 | 2.1 | 6.1 | H | H | 6660 | 3020 | | 13.8 | 4.8 |
| 61 | MD'M | 20 | 73 | 37 | 0 | 11 | 4 | H | H | 6680 | 3150 | | 18.9 | 16.8 |
| 62 | HSi(OEt)$_3$ | 9 | | 75 | 0 | 8.2 | 0 | H | H | 5480 | (b) | | 4.2 | |

TABLE II-continued

INVERTED SURFACTANTS FROM THIS STUDY.
R—EO$_x$—PO$_y$—L"$_z$—L$_v$—OR STRUCTURES AND SUPPORTING ANALYTICAL DATA

| I.S. # | SILICONE | POLYETHER | % RXN | x | y | z | v | R | R' | MW Target | MW gpc | MW OH# | % Si Target | % Si Grav |
|---|---|---|---|---|---|---|---|---|---|---|---|---|---|---|
| 63 | HSi(OEt)$_3$ | 9 | | 75 | 0 | 8.2 | 0 | H | H | 5260 | (b) | | 4.2 | |
| 64 | MD'M | 1 | (c) | 20 | 0 | 1.1 | 0 | H | H | 1290 | | | 7.2 | |
| 65 | MM' | 1 | (c) | 20 | 0 | 1.1 | 0 | H | H | 1210 | | | 5.1 | |
| 66 | MD'M | 2 | (c) | 69 | 0 | 3.7 | 0 | H | H | 4290 | | | 7.3 | |
| 67 | MM' | 2 | (c) | 69 | 0 | 3.7 | 0 | H | H | 4020 | | | 5.2 | |
| 68 | MM' | 3 | (c) | 100 | 0 | 5.3 | 0 | H | H | 5800 | | | 5.1 | |
| 69 | D$_4$D' | 2 | (c) | 69 | 0 | 3.7 | 0 | H | H | 4790 | | | 10.9 | |
| 70 | MD'M | 3 | (c) | 100 | 0 | 5.3 | 0 | H | H | 6200 | | | 7.2 | |
| 71 | MD'M | 4 | (c) | 170 | 0 | 9.1 | 0 | H | H | 10660 | | | 7.2 | |
| 72 | MD'M | 10 | (c) | 18 | 0 | 2.1 | 0 | H | H | 1530 | | | 11.6 | |
| 73 | MM' | 3 | (c) | 100 | 0 | 5.3 | 0 | H | H | 5800 | | | 5.1 | |
| 74 | MM' | 4 | (c) | 170 | 0 | 9.1 | 0 | H | H | 9990 | | | 5.1 | |
| 75 | MD'M | 12 | (c) | 57 | 0 | 6.3 | 0 | H | H | 4680 | | | 11.3 | |
| 76 | D$_4$D' | 10 | (c) | 18 | 0 | 2.1 | 0 | H | H | 1810 | | | 16.3 | |
| 77 | D$_4$D' | 12 | (c) | 57 | 0 | 6.3 | 0 | H | H | 5530 | | | 16.0 | |
| 78 | D$_4$D' | 1 | (c) | 20 | 0 | 1.1 | 0 | H | H | 1440 | | | 10.7 | |
| 79 | D$_4$D' | 4 | (c) | 170 | 0 | 9.1 | 0 | H | H | 11880 | | | 10.8 | |
| 80 | D$_4$D' | 3 | (c) | 100 | 0 | 5.3 | 0 | H | H | 6910 | | | 10.8 | |
| 81 | (MeO)$_3$SiH | 18 | (c) | 11 | 0 | 4.6 | 0 | H | H | 1580 | (b) | | 8.2 | |
| 82 | MD$_3$M' | 13 | (c) | 4 | 3.6 | 3.1 | 0 | H | H | 1850 | | | 23.5 | |
| 83 | MM' | 21 | (c) | 0.7 | 0 | 8.9 | 0 | H | H | 2370 | | | 21.1 | |
| 84 | MD'M | 13 | (c) | 4 | 3.6 | 3.1 | 0 | H | H | 1430 | | | 18.3 | |

(a) D$_4$D' source containing non-monofunctional SiH fluid impurities, causing some product crosslinking.
(b) Products gelled.
(c) NMR's not obtained; % RXN not determined; hence "x" and "v" were set at maximum z and minimum v.

TABLE III

RIGID "L PANEL" EVALUATIONS
(SLOW FORMULATION with PIP-375)

| I.S. # | PARTS; pphp | PANEL HEIGHT; in | PANEL WEIGHT; g | FLOW INDEX | K FACTOR | DENSITY; pcf | FOAM SET | FORMULATION |
|---|---|---|---|---|---|---|---|---|
| 5 | 0.60 | 9.51 | 112.02 | 9.80 | 0.141 | 2.60 | 1 | 1 |
| 11 | 0.60 | 8.31 | 111.41 | 8.61 | 0.145 | 2.74 | 1 | 1 |
| 1 | 0.60 | 8.66 | 111.70 | 8.95 | 0.144 | 2.77 | 1 | 1 |
| — | 0.60 | 16.50 | 113.05 | 11.06 | 0.131 | 2.03 | 2 | 1 |
| 1 | 0.60 | 11.50 | 111.27 | 9.19 | 0.138 | 2.71 | 2 | 1 |
| 28 | 0.60 | 13.70 | 112.08 | 10.02 | 0.129 | 2.51 | 2 | 1 |
| 35 | 0.60 | 6.20 | 109.10 | 7.17 | 0.249 | 3.44 | 2 | 1 |
| 36 | 0.60 | 9.70 | 111.17 | 8.46 | 0.141 | 2.64 | 2 | 1 |
| 38 | 0.60 | 0.00 | 111.23 | 0.00 | 0.000 | 0.00 | 2 | 1 |
| 39 | 0.60 | 0.00 | 112.74 | 0.00 | 0.000 | 0.00 | 2 | 1 |
| 45 | 0.60 | 15.20 | 112.36 | 10.60 | 0.129 | 2.33 | 3 | 1 |
| 46 | 0.60 | 16.40 | 113.27 | 11.00 | 0.147 | 1.99 | 3 | 1 |
| 47 | 0.60 | 14.20 | 112.88 | 10.15 | 0.131 | 2.49 | 3 | 1 |
| 48 | 0.60 | 16.20 | 112.57 | 11.02 | 0.141 | 2.01 | 3 | 1 |
| 49 | 0.60 | 17.20 | 112.27 | 11.42 | 0.130 | 1.94 | 3 | 1 |
| 50 | 0.60 | 13.60 | 112.75 | 9.92 | 0.128 | 2.56 | 3 | 1 |
| 51 | 0.60 | 17.20 | 112.60 | 11.38 | 0.123 | 1.96 | 3 | 1 |
| 52 | 0.60 | 15.50 | 113.16 | 10.64 | 0.125 | 2.27 | 3 | 1 |
| 53 | 0.60 | 17.10 | 113.29 | 11.27 | 0.127 | 1.98 | 3 | 1 |
| — | 0.60 | 15.00 | 111.52 | 10.60 | 0.132 | 2.30 | 3 | 1 |
| 57 | 0.60 | 11.00 | 110.29 | 9.07 | 0.156 | 2.89 | 4 | 1 |
| 58 | 0.60 | 12.50 | 111.60 | 10.00 | 0.159 | 2.51 | 4 | 1 |
| 60 | 0.60 | 14.50 | 110.18 | 10.52 | 0.130 | 2.42 | 4 | 1 |
| 54 | 0.60 | 15.00 | 111.83 | 10.57 | 0.125 | 2.31 | 4 | 1 |
| 55 | 0.60 | 15.00 | 111.85 | 10.56 | 0.125 | 2.34 | 4 | 1 |
| 56 | 0.60 | 15.80 | 113.87 | 10.69 | 0.125 | 2.26 | 4 | 1 |
| 53 | 0.60 | 16.25 | 112.07 | 11.05 | 0.135 | 2.09 | 4 | 1 |
| 51 | 0.60 | 16.21 | 112.70 | 10.97 | 0.126 | 2.15 | 4 | 1 |
| — | 0.60 | 14.80 | 111.19 | 10.54 | 0.128 | 2.32 | 4 | 1 |
| — | 0.60 | 15.50 | 112.95 | 10.66 | 0.130 | 2.30 | 4 | 1 |
| — | 0.60 | 15.80 | 113.59 | 10.72 | 0.126 | 2.17 | 5 | 1 |
| — | 0.60 | 13.80 | 113.51 | 9.93 | 0.128 | 2.37 | 5 | 1 |
| 51 | 0.60 | 16.60 | 113.25 | 11.05 | 0.123 | 2.01 | 5 | 1 |
| 53 | 0.60 | 16.50 | 113.02 | 11.06 | 0.126 | 2.06 | 5 | 1 |
| 64 | 0.60 | 5.00 | 110.01 | 6.61 | 0.205 | 2.96 | 5 | 1 |
| 66 | 0.60 | 13.00 | 110.70 | 9.85 | 0.140 | 2.28 | 5 | 1 |
| 60 | 0.60 | 15.80 | 113.80 | 10.69 | 0.129 | 2.11 | 5 | 1 |
| 72 | 0.60 | 13.70 | 112.46 | 9.98 | 0.129 | 2.47 | 5 | 1 |
| 75 | 0.60 | 13.50 | 112.67 | 9.80 | 0.122 | 2.52 | 5 | 1 |
| 65 | 0.60 | 0.00 | 0.00 | 0.00 | 0.000 | 0.00 | 5 | 1 |
| — | 0.60 | 12.00 | 109.96 | 9.51 | 0.135 | 2.55 | 6 | 1 |
| — | 0.60 | 12.50 | 112.20 | 9.52 | 0.135 | 2.53 | 6 | 1 |
| 52 | 0.60 | 14.10 | 111.76 | 10.20 | 0.122 | 2.36 | 6 | 1 |
| 78 | 0.60 | 11.50 | 111.54 | 9.17 | 0.134 | 2.66 | 6 | 1 |

TABLE III-continued

RIGID "L PANEL" EVALUATIONS
(SLOW FORMULATION with PIP-375)

| I.S. # | PARTS; pphp | PANEL HEIGHT; in | PANEL WEIGHT; g | FLOW INDEX | K FACTOR | DENSITY; pcf | FOAM SET | FORMULATION |
|---|---|---|---|---|---|---|---|---|
| 69 | 0.60 | 11.30 | 111.37 | 9.10 | 0.132 | 2.71 | 6 | 1 |
| 80 | 0.60 | 9.00 | 111.53 | 8.48 | 0.146 | 2.89 | 6 | 1 |
| 79 | 0.60 | 8.50 | 106.26 | 8.34 | 0.137 | 2.67 | 6 | 1 |
| 76 | 0.60 | 11.20 | 110.26 | 9.15 | 0.128 | 2.67 | 6 | 1 |
| 77 | 0.60 | 11.30 | 112.37 | 9.02 | 0.128 | 2.67 | 6 | 1 |
| 74 | 0.60 | 0.00 | 0.00 | 0.00 | 0.000 | 0.00 | 6 | 1 |
| 73 | 0.60 | 0.00 | 0.00 | 0.00 | 0.000 | 0.00 | 6 | 1 |
| 71 | 0.60 | 0.00 | 0.00 | 0.00 | 0.000 | 0.00 | 6 | 1 |
| — | 0.60 | 12.63 | 109.49 | 9.81 | 0.129 | 2.30 | 7 | 3 |
| 48 | 0.60 | 14.00 | 110.86 | 10.25 | 0.136 | 2.33 | 7 | 3 |
| 52 | 0.60 | 13.37 | 110.06 | 10.06 | 0.120 | 2.26 | 7 | 3 |
| 85 (a) | 0.60 | 13.67 | 111.22 | 10.08 | 0.124 | 2.30 | 7 | 3 |

(a) I.S. 85 as a 50/50 weight bond of I.S. 48 and I.S. 52.

TABLE IV

RIGID FOAM "BOX POUR" EVALUATIONS
(SLOW FORMULATION with PIP-375)

| I.S. # | PARTS; pphp | CREAM TIME; sec | GEL TIME; sec | TACT FREE TIME; sec | RISE TIME; sec | DENSITY; pcf | K FACTOR | FOAM SET | FORMULATION |
|---|---|---|---|---|---|---|---|---|---|
| — | 1.20 | 25 | 125 | 260 | 300 | 1.38 | 0.164 | 8 | 1 |
| 1 | 1.20 | 23 | 123 | 265 | 300 | 1.40 | 0.164 | 8 | 1 |
| 28 | 1.20 | 24 | 125 | 260 | 302 | 1.40 | 0.164 | 8 | 1 |
| 35 | 1.20 | 25 | 122 | 265 | 298 | 1.40 | 0.334 | 8 | 1 |
| 36 | 1.20 | 23 | 124 | 262 | 304 | 1.37 | 0.160 | 8 | 1 |
| 38 | 1.20 | | | TOTAL COLLAPSE | | | | 8 | 1 |
| 39 | 1.20 | | | TOTAL COLLAPSE | | | | 8 | 1 |
| 38 | 0.40 | | | TOTAL COLLAPSE | | | | 8 | 1 |
| 39 | 0.40 | | | TOTAL COLLAPSE | | | | 8 | 1 |
| 38 | 0.10 | A | A | A | A | 2.17 | A | 8 | 1 |
| 39 | 0.10 | A | A | A | A | 2.24 | A | 8 | 1 |
| 38 | 0.10 | A | A | A | A | 2.23 | A | 8 | 1 |
| 39 | 0.10 | A | A | A | A | 2.23 | A | 8 | 1 |
| 38 | 0.10 | A | A | A | A | 2.20 | A | 8 | 2 |
| 45 | 1.20 | 20 | 120 | 230 | 270 | 1.36 | 0.155 | 9 | 1 |
| 46 | 1.20 | 22 | 124 | 240 | 285 | 1.34 | 0.159 | 9 | 1 |
| 47 | 1.20 | 19 | 120 | 245 | 275 | 1.34 | 0.163 | 9 | 1 |
| 48 | 1.20 | 21 | 120 | 240 | 270 | 1.36 | 0.155 | 9 | 1 |
| 49 | 1.20 | 20 | 120 | 240 | 270 | 1.35 | 0.162 | 9 | 1 |
| 50 | 1.20 | 20 | 121 | 241 | 275 | 1.33 | 0.158 | 9 | 1 |
| 51 | 1.20 | 20 | 121 | 240 | 270 | 1.35 | 0.156 | 9 | 1 |
| 52 | 1.20 | 20 | 120 | 239 | 272 | 1.33 | 0.157 | 9 | 1 |
| 53 | 1.20 | 22 | 120 | 238 | 270 | 1.35 | 0.156 | 9 | 1 |

A = Not measured

TABLE V

RIGID "L PANEL" EVALUATIONS
(SLOW FORMULATION with LS-490)

| I.S. # | PARTS; pphp | PANEL HEIGHT; in | PANEL WEIGHT; g | FLOW INDEX | K FACTOR | DENSITY; pcf | FOAM SET | FORMULATION |
|---|---|---|---|---|---|---|---|---|
| — | 0.28 | 16.50 | 124.10 | 10.07 | 0.137 | 2.19 | 10 | 4 |
| 46 | 0.28 | 6.10 | 122.90 | 6.32 | 0.256 | 4.21 | 10 | 4 |
| 46 | 0.55 | 8.80 | 124.95 | 7.20 | 0.246 | 4.39 | 10 | 4 |
| 46 | 0.84 | 11.20 | 124.77 | 8.09 | 0.218 | 3.95 | 10 | 4 |
| 46 | 1.11 | 13.30 | 127.35 | 8.67 | 0.187 | 3.43 | 10 | 4 |
| 47 | 0.28 | 7.90 | 122.42 | 6.75 | 0.222 | 3.25 | 10 | 4 |
| 47 | 0.55 | 6.60 | 122.67 | 6.52 | 0.199 | 3.45 | 10 | 4 |
| 47 | 0.84 | 6.40 | 123.21 | 6.42 | 0.198 | 3.42 | 10 | 4 |
| 47 | 1.11 | 5.90 | 122.54 | 6.27 | 0.199 | 4.11 | 10 | 4 |
| — | 0.28 | 15.50 | 126.22 | 9.54 | 0.138 | 2.30 | 11 | 4 |
| 51 | 0.28 | 14.20 | 125.61 | 9.12 | 0.148 | 2.49 | 11 | 4 |
| 51 | 0.55 | 15.70 | 128.91 | 9.41 | 0.140 | 2.39 | 11 | 4 |
| 51 | 0.84 | 15.30 | 127.98 | 9.35 | 0.136 | 2.40 | 11 | 4 |
| 51 | 1.11 | 15.80 | 128.14 | 9.50 | 0.136 | 2.32 | 11 | 4 |
| 52 | 0.28 | 11.40 | 126.26 | 8.06 | 0.149 | 2.94 | 11 | 4 |
| 52 | 0.55 | 11.60 | 128.91 | 7.97 | 0.152 | 2.99 | 11 | 4 |
| 52 | 0.84 | 11.30 | 126.84 | 7.99 | 0.140 | 2.98 | 11 | 4 |
| 52 | 1.11 | 11.70 | 128.67 | 8.01 | 0.144 | 2.96 | 11 | 4 |
| — | 0.56 | 14.00 | 121.88 | 9.32 | 0.137 | 2.32 | 12 | 4 |
| 57 | 0.56 | 9.40 | 120.54 | 7.69 | 0.156 | 3.22 | 12 | 4 |
| 58 | 0.56 | 10.60 | 120.59 | 7.76 | 0.175 | 2.70 | 12 | 4 |
| 60 | 0.56 | 12.30 | 121.39 | 8.91 | 0.149 | 2.65 | 12 | 4 |

TABLE V-continued

RIGID "L PANEL" EVALUATIONS (SLOW FORMULATION with LS-490)

| I.S. # | PARTS; pphp | PANEL HEIGHT; in | PANEL WEIGHT; g | FLOW INDEX | K FACTOR | DENSITY; pcf | FOAM SET | FORMULATION |
|---|---|---|---|---|---|---|---|---|
| 53 | 0.56 | 11.30 | 122.90 | 8.25 | 0.186 | 2.85 | 12 | 4 |
| 54 | 0.56 | 12.00 | 120.79 | 8.65 | 0.144 | 2.58 | 12 | 4 |
| 55 | 0.56 | 12.40 | 122.07 | 8.71 | 0.148 | 2.75 | 12 | 4 |
| 56 | 0.56 | 12.40 | 121.52 | 8.75 | 0.148 | 2.68 | 12 | 4 |
| — | 1.11 | 15.20 | 122.79 | 9.69 | 0.134 | 2.22 | 13 | 4 |
| 57 | 1.11 | 10.40 | 121.52 | 8.00 | 0.155 | 3.08 | 13 | 4 |
| 58 | 1.11 | 15.20 | 123.03 | 9.60 | 0.143 | 2.40 | 13 | 4 |
| 60 | 1.11 | 13.90 | 123.12 | 9.19 | 0.149 | 2.67 | 13 | 4 |
| 54 | 1.11 | 13.10 | 123.90 | 8.84 | 0.140 | 2.53 | 13 | 4 |
| 55 | 1.11 | 12.80 | 121.15 | 8.93 | 0.146 | 2.58 | 13 | 4 |
| 56 | 1.11 | 12.80 | 122.79 | 8.81 | 0.144 | 2.58 | 13 | 4 |
| — | 1.67 | 15.20 | 122.62 | 9.71 | 0.128 | 2.22 | 14 | 4 |
| 57 | 1.67 | 10.30 | 121.32 | 7.98 | 0.148 | 3.07 | 14 | 4 |
| 58 | 1.67 | 13.00 | 121.74 | 8.96 | 0.130 | 2.32 | 14 | 4 |
| 60 | 1.67 | 14.90 | 122.02 | 9.65 | 0.139 | 2.72 | 14 | 4 |
| 53 | 1.67 | 15.20 | 122.55 | 9.72 | 0.142 | 2.26 | 14 | 4 |
| 54 | 1.67 | 13.90 | 123.56 | 9.16 | 0.130 | 2.46 | 14 | 4 |
| 65 | 1.67 | 12.30 | 122.46 | 8.65 | 0.143 | 2.67 | 14 | 4 |
| 56 | 1.67 | 12.50 | 122.63 | 8.71 | 0.141 | 2.63 | 14 | 4 |
| — | 2.22 | 15.00 | 124.19 | 9.52 | 0.127 | 2.18 | 15 | 4 |
| 57 | 2.22 | 9.90 | 121.32 | 7.83 | 0.151 | 3.13 | 15 | 4 |
| 58 | 2.22 | 14.60 | 122.15 | 9.53 | 0.130 | 2.33 | 15 | 4 |
| 60 | 2.22 | 12.80 | 121.41 | 8.91 | 0.136 | 2.70 | 15 | 4 |
| 53 | 2.22 | 15.50 | 122.42 | 9.84 | 0.134 | 2.26 | 15 | 4 |
| 54 | 2.22 | 12.80 | 121.39 | 8.91 | 0.132 | 2.51 | 15 | 4 |
| 55 | 2.22 | 11.20 | 121.40 | 8.31 | 0.140 | 2.76 | 15 | 4 |
| 56 | 2.22 | 12.50 | 122.76 | 8.70 | 0.141 | 2.70 | 15 | 4 |
| — | 0.56 | 14.80 | 121.79 | 9.63 | 0.132 | 2.27 | 16 | 4 |
| 45 | 0.56 | 12.00 | 120.38 | 8.68 | 0.145 | 2.75 | 16 | 4 |
| 48 | 0.56 | 8.00 | 119.36 | 7.24 | 0.300 | 3.11 | 16 | 4 |
| 59 | 0.56 | 14.50 | 122.06 | 9.50 | 0.139 | 2.30 | 16 | 4 |
| 50 | 0.56 | 10.00 | 120.27 | 7.94 | 0.131 | 2.80 | 16 | 4 |
| — | 1.11 | 14.90 | 121.99 | 9.65 | 0.128 | 2.20 | 16 | 4 |
| 45 | 1.11 | 13.20 | 122.16 | 9.00 | 0.138 | 2.69 | 16 | 4 |
| 48 | 1.11 | 10.30 | 119.47 | 8.10 | 0.217 | 2.79 | 16 | 4 |
| 59 | 1.11 | 14.70 | 123.61 | 9.45 | 0.135 | 2.30 | 16 | 4 |
| 50 | 1.11 | 10.20 | 121.16 | 7.95 | 0.148 | 2.95 | 16 | 4 |
| — | 2.22 | 14.80 | 121.91 | 9.62 | 0.127 | 2.09 | 17 | 4 |
| 45 | 2.22 | 13.80 | 122.81 | 9.10 | 0.136 | 2.57 | 17 | 4 |
| 48 | 2.22 | 16.30 | 119.38 | 10.39 | 0.139 | 2.20 | 17 | 4 |
| 49 | 2.22 | 15.10 | 124.16 | 9.56 | 0.133 | 2.29 | 17 | 4 |
| 50 | 2.22 | 10.60 | 119.61 | 8.21 | 0.149 | 2.94 | 17 | 4 |

TABLE VI

RIGID "L PANEL" EVALUATIONS (FAST FORMULATION with LS-490)

| I.S. # | PARTS; pphp | PANEL HEIGHT; in | PANEL WEIGHT; g | FLOW INDEX | K FACTOR | DENSITY pcf | FOAM SET | FORMULATION |
|---|---|---|---|---|---|---|---|---|
| — | 0.56 | 14.60 | 121.35 | 9.59 | 0.130 | 2.36 | 18 | 5 |
| 57 | 0.56 | 9.80 | 119.49 | 7.91 | 0.140 | 2.99 | 18 | 5 |
| 58 | 0.56 | 11.30 | 119.83 | 8.46 | 0.185 | 2.82 | 18 | 5 |
| 60 | 0.56 | 9.20 | 119.62 | 7.68 | 0.211 | 3.05 | 18 | 5 |
| 53 | 0.56 | 11.60 | 121.49 | 8.46 | 0.184 | 2.74 | 18 | 5 |
| 54 | 0.56 | 13.00 | 122.56 | 8.90 | 0.132 | 2.65 | 18 | 5 |
| 55 | 0.56 | 12.60 | 121.15 | 8.85 | 0.132 | 2.73 | 18 | 5 |
| — | 1.11 | 15.40 | 119.86 | 10.01 | 0.129 | 2.26 | 19 | 5 |
| 57 | 1.11 | 10.50 | 118.52 | 8.25 | 0.143 | 2.91 | 19 | 5 |
| 58 | 1.11 | 14.60 | 120.19 | 9.60 | 0.135 | 2.41 | 19 | 5 |
| 60 | 1.11 | 13.50 | 119.63 | 9.31 | 0.134 | 2.67 | 19 | 5 |
| 53 | 1.11 | 15.30 | 120.96 | 9.80 | 0.130 | 2.37 | 19 | 5 |
| 54 | 1.11 | 13.80 | 120.77 | 9.33 | 0.126 | 2.50 | 19 | 5 |
| 55 | 1.11 | 13.50 | 119.60 | 9.31 | 0.126 | 2.62 | 19 | 5 |
| 56 | 1.11 | 13.90 | 120.91 | 9.36 | 0.125 | 2.57 | 19 | 5 |
| — | 1.67 | 15.30 | 121.90 | 9.81 | 0.122 | 2.24 | 20 | 5 |
| 57 | 1.67 | 10.90 | 120.15 | 8.20 | 0.127 | 2.89 | 20 | 5 |
| 58 | 1.67 | 14.60 | 121.80 | 9.55 | 0.126 | 2.44 | 20 | 5 |
| 60 | 1.67 | 13.10 | 120.98 | 9.05 | 0.129 | 2.66 | 10 | 5 |
| 53 | 1.67 | 15.00 | 120.29 | 9.82 | 0.130 | 2.30 | 20 | 5 |
| 54 | 1.67 | 14.00 | 121.53 | 9.35 | 0.126 | 2.57 | 10 | 5 |
| 55 | 1.67 | 13.40 | 120.15 | 9.23 | 0.127 | 2.60 | 20 | 5 |
| 56 | 1.67 | 13.70 | 121.95 | 9.21 | 0.127 | 2.57 | 20 | 5 |
| — | 2.22 | 15.50 | 121.83 | 9.89 | 0.134 | 2.15 | 21 | 5 |
| 57 | 2.22 | 11.00 | 119.56 | 8.36 | 0.120 | 2.72 | 21 | 5 |
| 58 | 2.22 | 15.30 | 120.99 | 9.88 | 0.125 | 2.23 | 21 | 5 |
| 60 | 2.22 | 13.70 | 120.26 | 9.33 | 0.127 | 2.55 | 21 | 5 |

TABLE VI-continued

RIGID "L PANEL" EVALUATIONS
(FAST FORMULATION with LS-490)

| I.S. # | PARTS; pphp | PANEL HEIGHT; in | PANEL WEIGHT; g | FLOW INDEX | K FACTOR | DENSITY pcf | FOAM SET | FORMULATION |
|---|---|---|---|---|---|---|---|---|
| 53 | 2.22 | 16.20 | 123.19 | 10.04 | 0.127 | 2.15 | 21 | 5 |
| 54 | 2.22 | 14.00 | 122.33 | 9.29 | 0.122 | 2.45 | 21 | 5 |
| 55 | 2.22 | 13.30 | 119.49 | 9.24 | 0.123 | 2.46 | 21 | 5 |
| 56 | 2.22 | 13.70 | 119.30 | 9.41 | 0.126 | 2.42 | 21 | 5 |

Although the invention has been illustrated by the preceding examples, it is not to be construed as being limited to the materials employed therein, but rather, the invention relates to the generic area as herein before disclosed. Various modifications and embodiments thereof can be made without departing from the spirit or scope thereof.

What is claimed is:

1. A high resilient polyurethane foam slab prepared from a formulation comprising as at least one silicone polyether copolymer surfactant comprised of a polyether backbone having an average at least three pendant groups of the formula:

$$-\text{SiR}'_a\text{O}_{\frac{(3-a)}{2}}\text{R}''_b$$

attached to said polyether backbone through a divalent aliphatic group having 2 to 10 carbon atoms and which may contain at least one heteroatom of the group of O, N and S, said heteroatom being located within said divalent aliphatic group and wherein R' represents $C_1$–$C_3$, R" or OR'"; R" represents $$\text{SiR}'_c\text{O}_{\frac{(4-c)}{2}}$$

and R'" represents $C_1$–$C_3$; and a, b and c have a value from 0 to 3; said silicone polyether copolymer surfactant being characterized by
  (a) a narrow uni-modal distribution;
  (b) being essentially free of silicone oils and process polyethers; and
  (c) any unreacted unsaturated groups on said polyether backbone are deactivated.

2. A high resilient rigid polyurethane foam prepared from a formulation comprising as at least one silicone polyether copolymer surfactant comprised of a polyether backbone having an average at least three pendant groups of the formula;

$$-\text{SiR}'_a\text{O}_{\frac{(3-a)}{2}}\text{R}''_b$$

attached to said polyether backbone through a divalent aliphatic group having 2 to 10 carbon atoms and which may contain at least one heteroatom of the group of O, N and S, said heteroatom being located within said divalent aliphatic group and wherein R' represents $C_1$–$C_3$, R" or OR'"; R" represents $$\text{SiR}'_c\text{O}_{\frac{(4-c)}{2}}$$

and R'" represents $C_1$–$C_3$; and a, b and c have a value from 0 to 3; said silicone polyether copolymer surfactant being characterized by
  (a) a narrow uni-modal distribution;
  (b) being essentially free of silicone oils and process polyethers; and
  (c) any unreacted unsaturated groups on said polyether backbone are deactivated.

3. A high resilient molded polyurethane foam prepared from a formulation comprising as at least one silicone polyether copolymer surfactant comprised of a polyether backbone having an average at least three pendant groups of the formula;

$$-\text{SiR}'_a\text{O}_{\frac{(3-a)}{2}}\text{R}''_b$$

attached to said polyether backbone through a divalent aliphatic group having 2 to 10 carbon atoms and which may contain at least one heteroatom of the group of O, N and S, said heteroatom being located within said divalent aliphatic group and wherein R' represents $C_1$–$C_3$, R" or OR'"; R" represents $$\text{SiR}'_c\text{O}_{\frac{(4-c)}{2}}$$

and R'" represents $C_1$–$C_3$; and a, b and c have a value from 0 to 3; said silicone polyether copolymer surfactant being characterized by
  (a) a narrow uni-modal distribution;
  (b) being essentially free of silicone oils and process polyethers; and
  (c) any unreacted unsaturated groups on said polyether backbone are deactivated.

* * * * *